(12) United States Patent
Otsuka et al.

(10) Patent No.: US 12,512,173 B2
(45) Date of Patent: Dec. 30, 2025

(54) MEMORY CIRCUIT

(71) Applicant: Socionext Inc., Kanagawa (JP)

(72) Inventors: Tatsushi Otsuka, Yokohama (JP); Yuya Shigenobu, Yokohama (JP); Tokushi Yamaguchi, Yokohama (JP)

(73) Assignee: SOCIONEXT INC., Kanagawa (JP)

( * ) Notice: Subject to any disclaimer, the term of this patent is extended or adjusted under 35 U.S.C. 154(b) by 119 days.

(21) Appl. No.: 18/640,912

(22) Filed: Apr. 19, 2024

(65) Prior Publication Data

US 2024/0355406 A1 Oct. 24, 2024

(30) Foreign Application Priority Data

Apr. 24, 2023 (JP) ................. 2023-070700

(51) Int. Cl.
*G11C 29/12* (2006.01)
*G11C 29/00* (2006.01)
*G11C 29/38* (2006.01)

(52) U.S. Cl.
CPC .......... *G11C 29/1201* (2013.01); *G11C 29/38* (2013.01); *G11C 29/76* (2013.01)

(58) Field of Classification Search
CPC ...... G11C 29/1201; G11C 29/38; G11C 29/76
See application file for complete search history.

(56) References Cited

U.S. PATENT DOCUMENTS

| 5,446,692 | A | 8/1995 | Haraguchi et al. |
| 2003/0117867 | A1 | 6/2003 | Taura et al. |
| 2010/0124133 | A1 | 5/2010 | Sarin et al. |
| 2024/0257889 | A1* | 8/2024 | Kim ........................ G11C 29/76 |
| 2024/0321375 | A1* | 9/2024 | Han ........................ G11C 29/44 |

FOREIGN PATENT DOCUMENTS

| JP | H01-128300 A | 5/1989 |
| JP | H05-290598 A | 11/1993 |
| JP | H08-007597 A | 1/1996 |
| JP | 2003-187591 A | 7/2003 |
| JP | 2012-509541 A | 4/2012 |

* cited by examiner

*Primary Examiner* — Xiaochun L Chen
(74) *Attorney, Agent, or Firm* — Rimon P.C.

(57) ABSTRACT

A memory circuit includes: a plurality of memory parts, each of which includes a plurality of first memory cells and a second memory cell that is accessed when one of the first memory cells is defective; a plurality of first memory control parts, each of which is configured to control access to a corresponding one of the plurality of memory parts based on a first access request addressing the corresponding memory part, during a first mode; and a second memory control part shared by the plurality of memory parts, and configured to control access to the plurality of memory parts based on a second access request during a second mode.

10 Claims, 23 Drawing Sheets

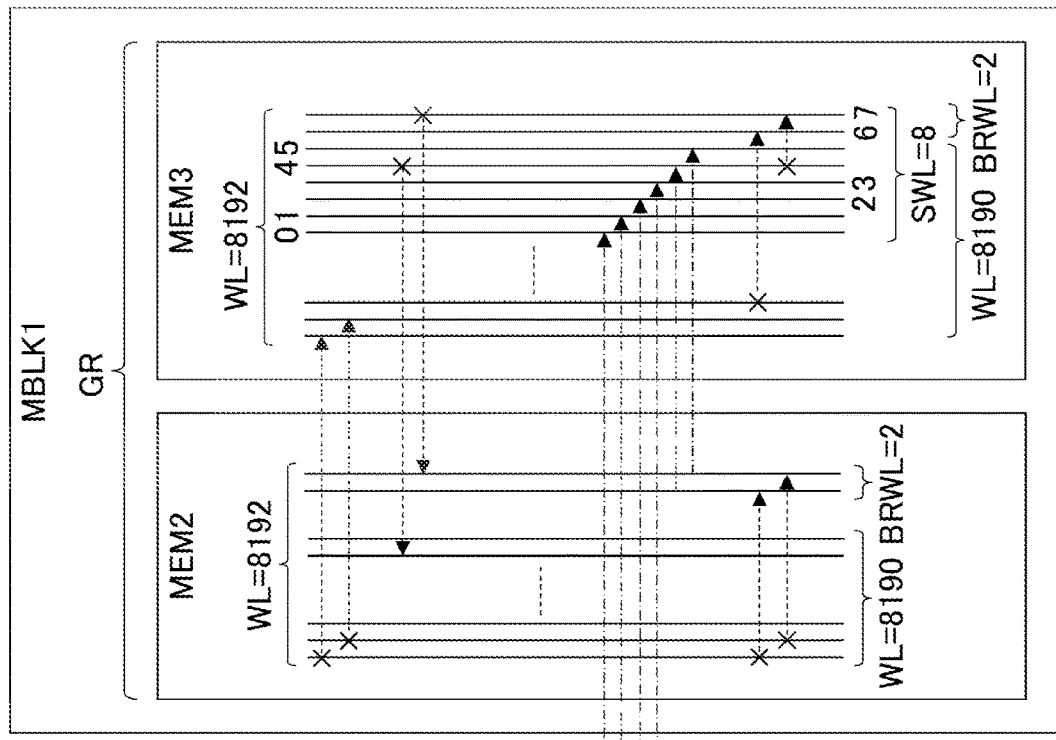
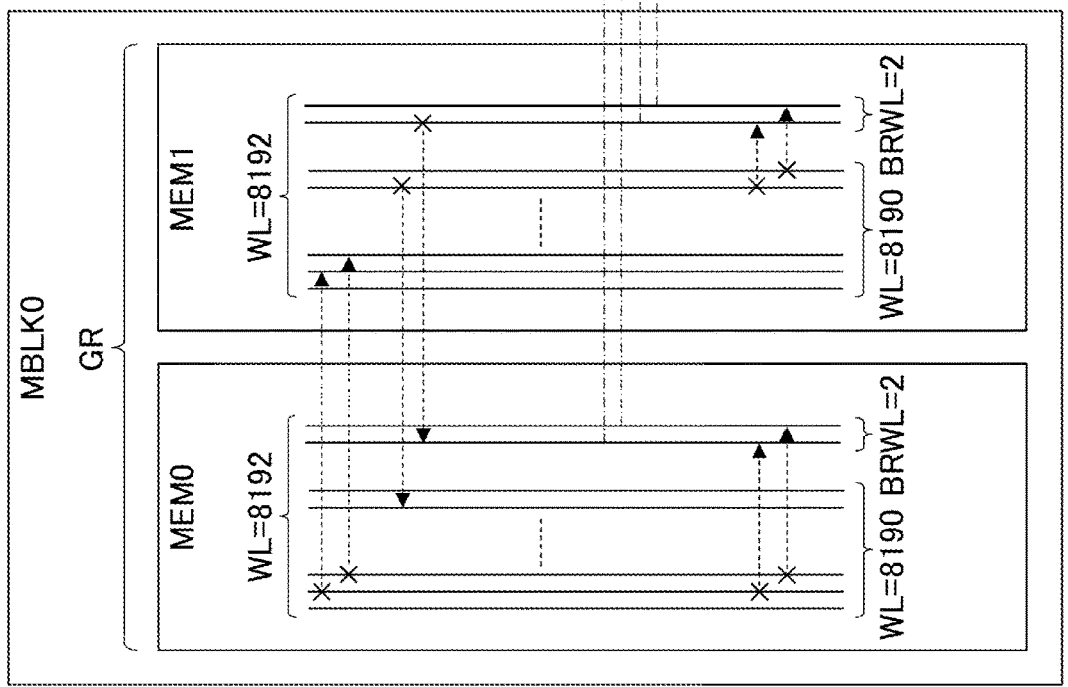
FIG.16

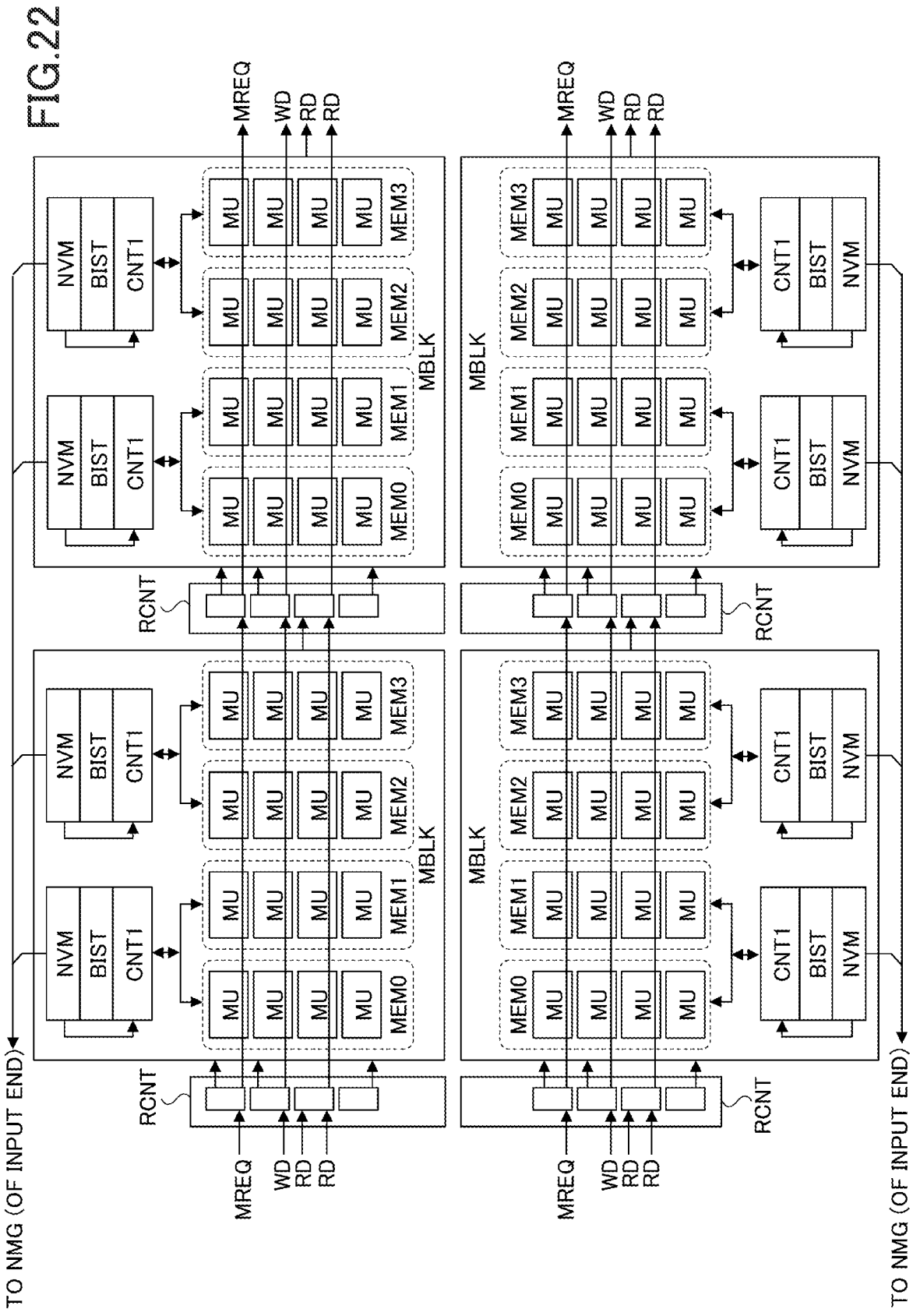

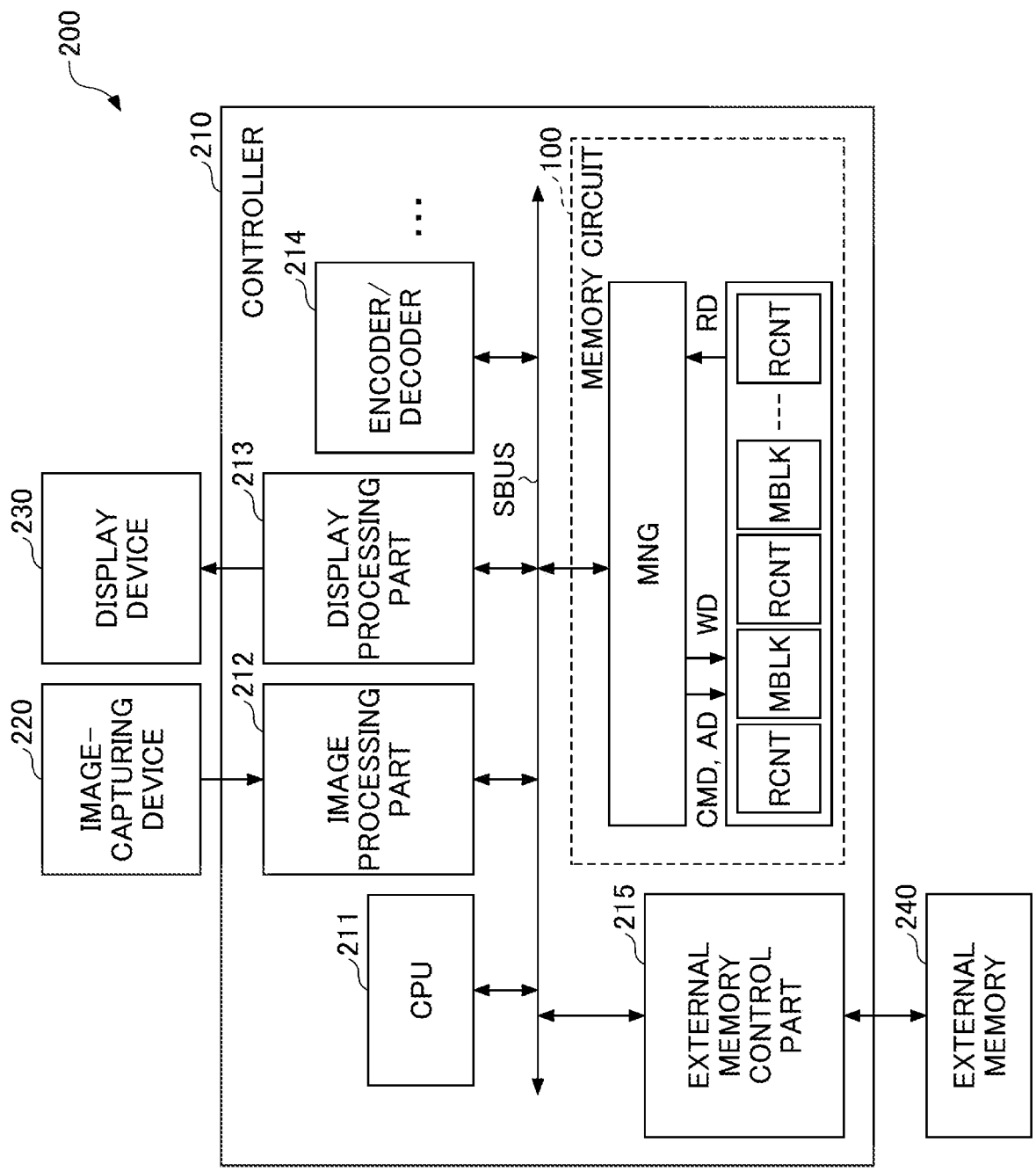

MEMORY CIRCUIT

CROSS-REFERENCE TO RELATED APPLICATIONS

This application is based on and claims priority to Japanese Patent Application No. 2023-070700, filed on Apr. 24, 2023, the entire contents of which are incorporated herein by reference.

BACKGROUND

1. Field of the Invention

The present invention relates to a memory circuit.

2. Description of the Related Art

Given a semiconductor memory device having multiple blocks, each block including memory cells, there is a method of providing redundancy columns for rescuing defects in each block and redundancy block (see, for example, patent document 1). For memory devices with multiple memory blocks, there is a method of rescuing defects in units of memory blocks (see, for example, see patent document 2).

For a non-volatile memory, there is a method to switch the destination where a defective address is output, to a redundancy memory space, by using a switching circuit when there is a defect in the memory space (see, for example, patent document 3). Also, for a non-volatile memory, a method is known whereby a redundancy memory cell array is provided in each of multiple memory blocks and used to rescue defective memory cells in other memory blocks (see, for example, patent document 4). In a non-volatile semiconductor memory device, there is a method whereby a non-volatile memory cell that has exhibited a decline in write performance or erase performance is automatically replaced with a redundancy cell or cell block (see, for example, patent document 5).

CITATION LIST

Patent Document

[Patent Document 1] Japanese Patent Application Publication No. 2003-187591
[Patent Document 2] Japanese Patent Application Publication No. 2012-509541
[Patent Document 3] Japanese Patent Application Publication No. HEI01-128300
[Patent Document 4] Japanese Patent Application Publication No. HEI05-290598
[Patent Document 5] Japanese Patent Application Publication No. HEI08-007597

SUMMARY OF THE INVENTION

Technical Problem

Now, a memory circuit embedded in a large-scale integration (LSI) system or the like needs to use different memory capacities depending on the application, and multiple applications might even share one memory circuit. It is therefore preferable that this type of memory circuit has an operation mode in which the memory circuit operates as one large-capacity memory, and an operation mode in which the memory circuit operates as multiple small-capacity memories; however, no such method has been proposed.

The present invention has been made in view of the foregoing, and aims to provide a memory circuit that can operate as multiple small-capacity memories and as a large-capacity memory by switching its operation mode.

Solution to Problem

According to one aspect of the present invention, a memory circuit is provided. This memory circuit includes:
  a plurality of memory parts, each of which includes a plurality of first memory cells and a second memory cell that is accessed when one of the first memory cells is defective;
  a plurality of first memory control parts, each of which is configured to control access to a corresponding one of the plurality of memory parts based on a first access request addressing the corresponding memory part, during a first mode; and
  a second memory control part shared by the plurality of memory parts, and configured to control access to the plurality of memory parts based on a second access request during a second mode, and
  a predetermined one of the plurality of memory parts includes a plurality of third memory cells that correspond, respectively, to a plurality of second memory cells in the plurality of memory parts, and
  when a first address that specifies an inaccessible one of the first memory cells is included in the first access request during the first mode, a corresponding one of the first memory control parts converts the first address to a second address that specifies the second memory cell, and outputs the second address to the corresponding one of the plurality of memory parts, and
  when a second address that specifies one of the plurality of second memory cells in the plurality of memory parts is included in the second access request, the second memory control part converts the second address to a third address that specifies one of the plurality of third memory cells, and outputs the third address to the predetermined one of the plurality of memory parts including the plurality of third memory cells.

Advantageous Effects of the Invention

According to the technique disclosed herein, it is possible to provide a memory circuit that can operate as multiple small-capacity memories and as a large-capacity memory by switching its operation mode.

BRIEF DESCRIPTION OF THE DRAWINGS

FIG. 16 is a diagram for explaining an example of word rescue in each memory block in FIG. 15;

FIG. 22 is a block diagram that illustrates another example in which the memory groups of FIG. 20 are structured; and FIG. 23 is a block diagram that illustrates an example of a system in which the memory circuit of FIG. 1 is installed.

DETAILED DESCRIPTION OF THE PREFERRED EMBODIMENTS

Embodiments of the present invention will be described below with reference to the accompanying drawings. In the following description, signal lines in which information such as signals travel will be referred to as by the same names as signals.

Figure 1:
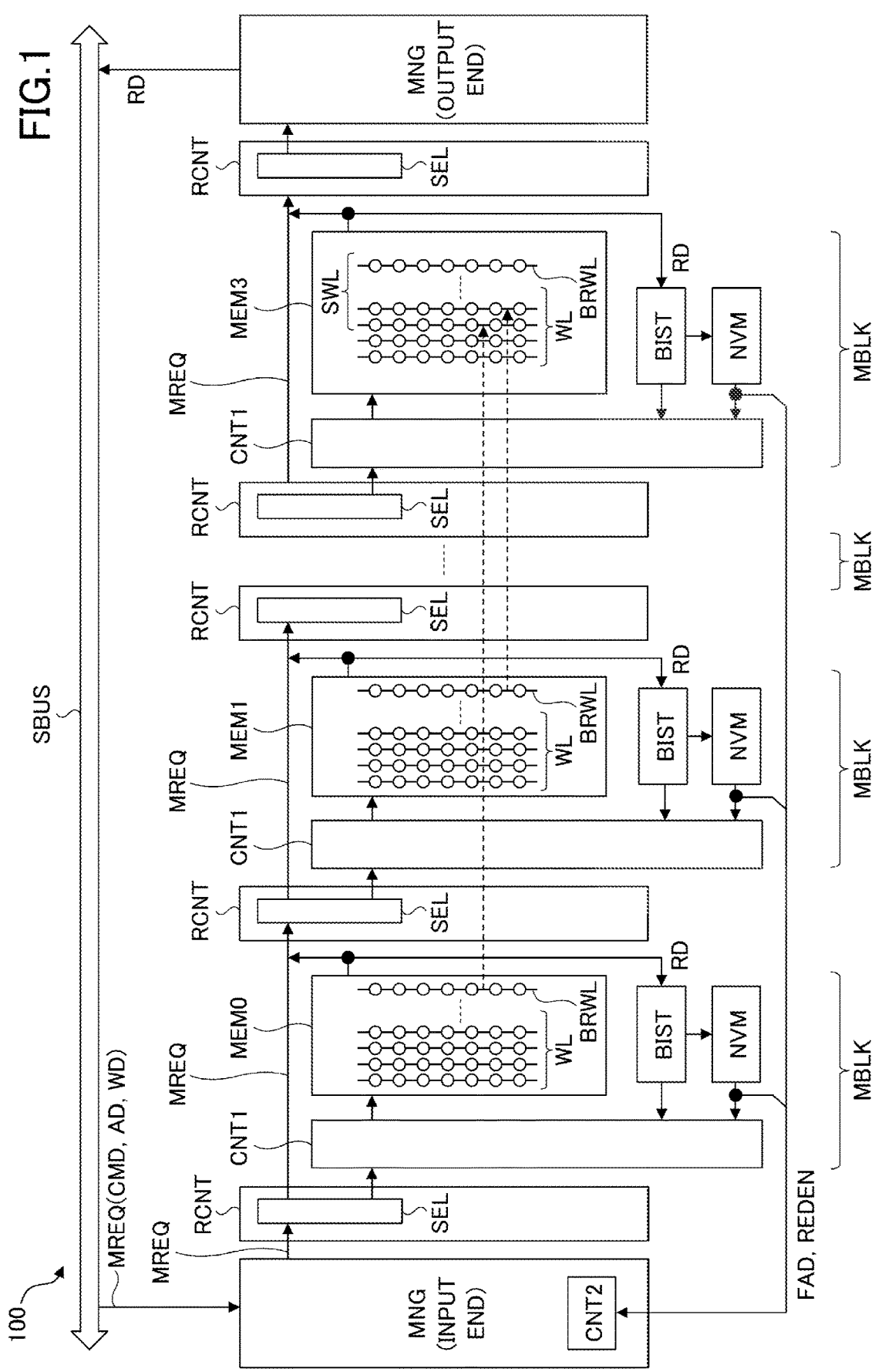
FIG. 1 is a block diagram that illustrates an overview of a memory circuit according to a first embodiment.

FIG. 1 illustrates an overview of a memory circuit according to a first embodiment. The memory circuit 100 illustrated in FIG. 1 is, for example, a static random access memory (SRAM), and implemented in a semiconductor device such as an LSI system that processes image data. For example, a semiconductor device including the memory circuit 100 is installed in an image-capturing device such as a surveillance camera, a head-mounted device such as an augmented reality/virtual reality (AR/VR) glass, a digital camera, and so forth, and generates image/movie data and the like to be displayed on a display device.

The memory circuit 100 has a memory management part MNG at the input end, another memory management part MNG at the output end, multiple repeater control parts RCNT, multiple memory blocks MBLK, and a system bus SBUS. The multiple control parts RCNT and memory blocks MBLK are arranged alternately between the memory management part MNG of the input end and the memory management part MNG of the output end. In what follows, when the memory management part MNG of the input end and the memory management part MNG of the output end are explained without distinction, reference will be simply be made to "the memory management parts MNG."

Each memory block MBLK has a memory part MEM (MEM0, MEM1, MEM2, or MEM3), which includes multiple memory cells therein, and a memory control part CNT1 placed on the input side of the memory part MEM. The memory control part CNT1 is an example of a first memory control part. Also, each memory block MBLK has a test circuit, or a built-in self test (BIST) circuit, and a non-volatile memory NVM, placed in association with the memory control part CNT1.

In FIG. 1, four memory blocks MBLK are illustrated; but the number of memory blocks MBLK has only to be 1 or more. Note that, when there is one memory block MBLK, this memory block MBLK should have multiple memory parts MEM.

In the example illustrated in FIG. 1, the memory parts MEM0 to MEM3 each include multiple word lines WL and a predetermined number of bubble redundancy word lines BRWL. Also, in the last memory part MEM3, a predetermined number of word lines WL and the bubble redundancy word line BRWL also function as sub-word lines SWL. The bubble redundancy word lines BRWL and sub-word lines SWL will be described later with reference to FIG. 2. Note that the location of the memory part MEM3 with sub-word lines SWL is by no means limited to the last part of the memory circuit 100, and may be placed on the input side of the memory part MEM0 or between the memory parts MEM1 and MEM2. How the word lines WL and so forth are placed in the memory parts MEM will be described later with reference to FIG. 2.

Referring to FIG. 1, the circular symbols of the word lines WL, bubble redundancy word lines BRWL, and sub-word lines SWL represent memory cells. For example, each memory cell connected to the word lines WL is an example of a first memory cell. Each memory cell connected to the bubble redundancy word lines BRWL is an example of a second memory cell. Each memory cell connected to the sub-word lines SWL is an example of a third memory cell.

The memory management parts MNG are connected to the system bus SBUS and operate during normal operation mode, in which access requests MREQ arrive from the system bus SBUS; the memory management parts MNG do not operate during test mode. Normal operation mode is an example of a second mode, and test mode is an example of a first mode. An access request MREQ that arrives from the system bus SBUS is an example of a second access request. The memory management parts MNG function as interface circuits for signals that are input from/output to the system bus SBUS and signals that are input from/output to the memory blocks MBLK.

The memory management part MNG of the input end receives an access request MREQ, which includes a command CMD, an address AD, write data WD, and so forth that are used when accessing a memory block MBLK, from a higher-level controller such as a central processing unit (CPU), via the system bus SBUS. An access request MREQ is either a write request or a read request. When an access request MREQ arrives, the memory management part MNG of the input end outputs this to a first repeater control part RCNT.

Figure 2:
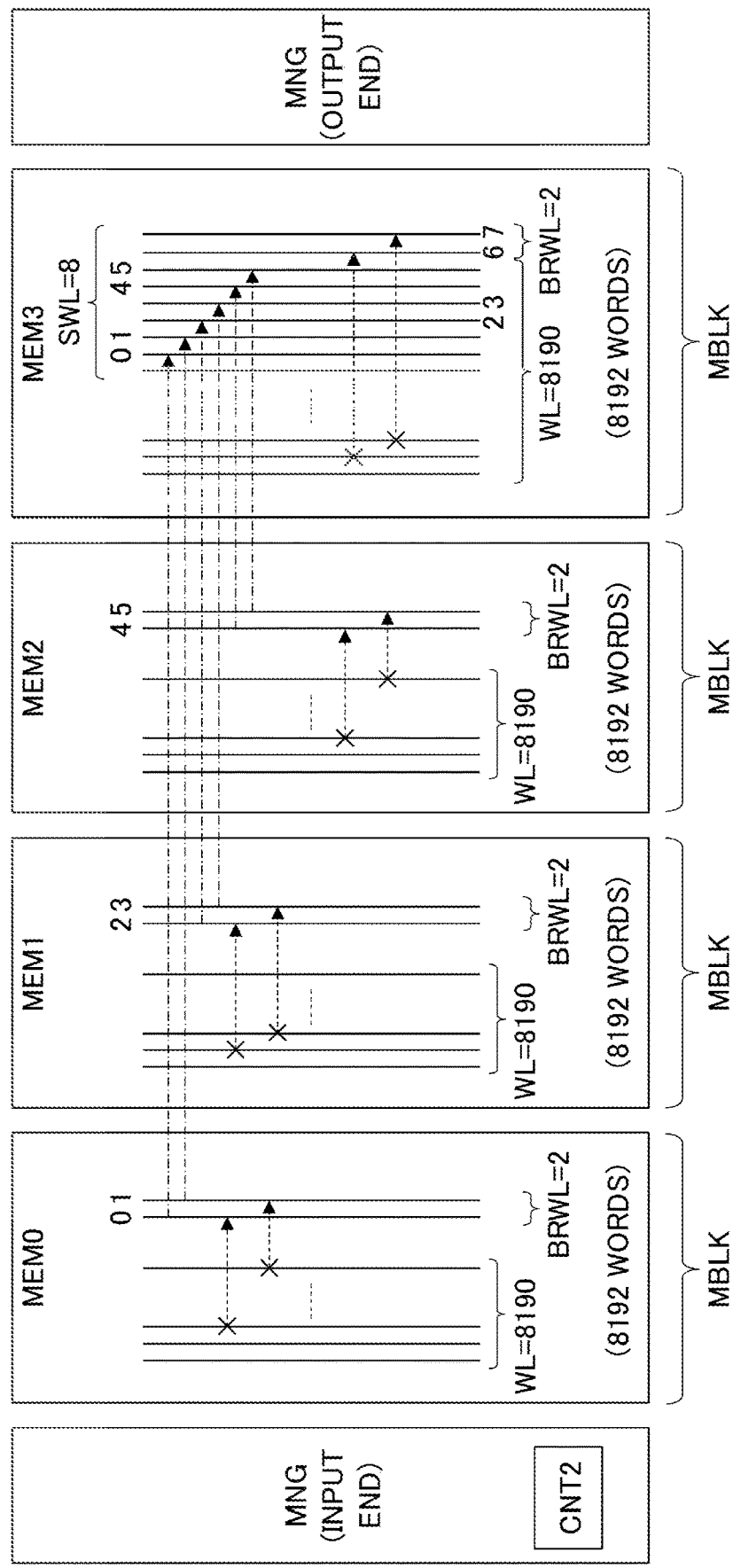
FIG. 2 is a diagram for explaining an example of word rescue in each memory part in FIG. 1.
Figure 7:
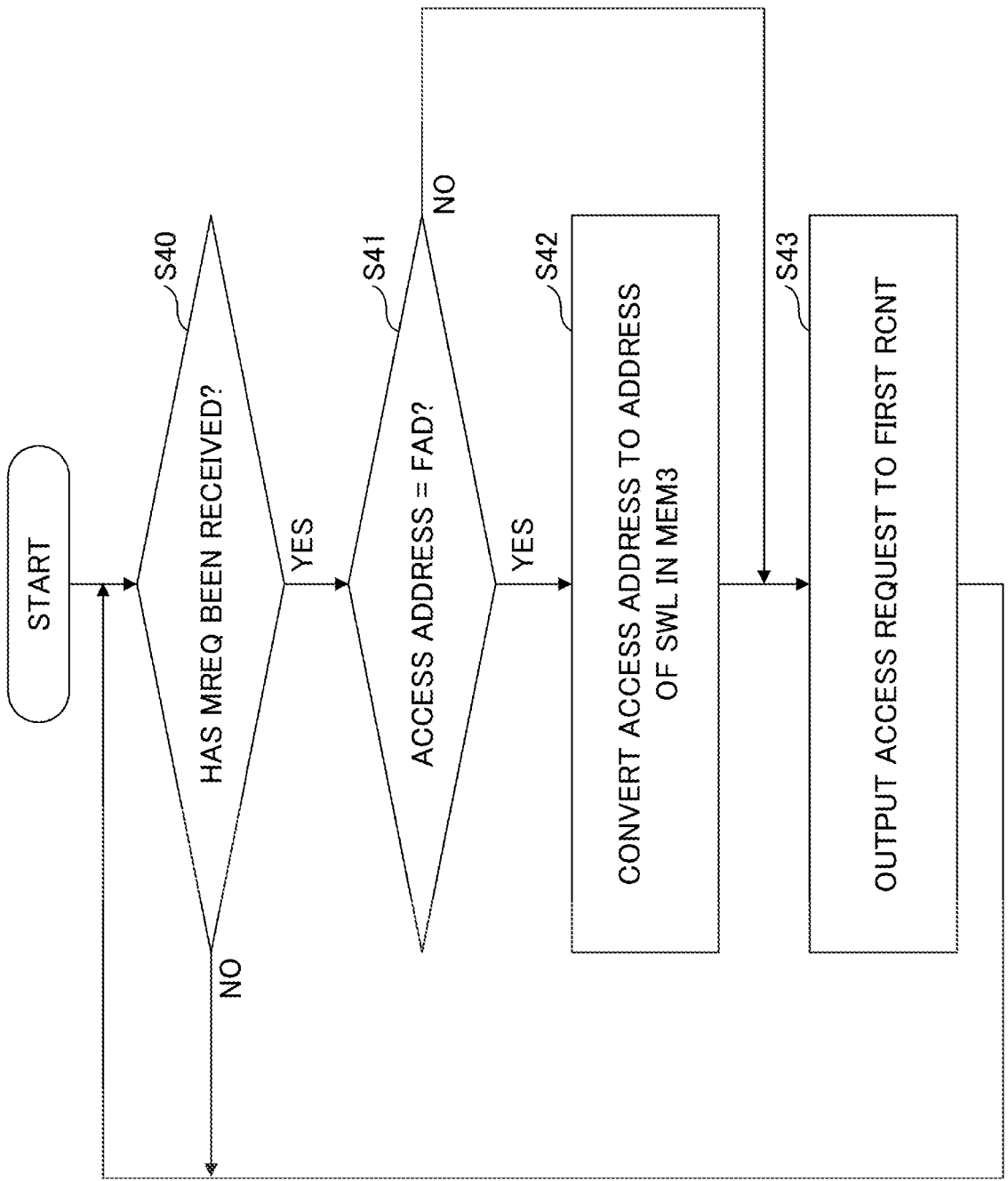
FIG. 7 is a flowchart that illustrates an example operation of a memory control part CNT2 upon receipt of an access request via a system bus.

The memory management part MNG of the input end has a memory control part CNT2, which is shared by multiple memory blocks MBLK. The memory control part CNT2 is an example of a second memory control part. The memory control part CNT2 knows the bubble redundancy word lines BRWL in multiple memory parts MEM by referencing the defect information (including fail addresses FAD, redundancy enables REDEN, etc.) stored in multiple non-volatile memories NVM, or from the specification. The memory control part CNT2 determines the transfer destination of an access request MREQ, and converts the address AD included in the access request MREQ to an address AD for the transfer destination determined. FIG. 2 and FIG. 7 illustrate example operations of the memory control part CNT2.

In FIG. 1, the memory management part MNG of the input end and the memory management part MNG of the output end are placed apart. However, the memory management part MNG of the input end and the memory management part MNG of the output end may be placed so as to form one memory management part MNG. In this case, multiple repeater control parts RCNT and multiple memory blocks MBLK may be arrayed in the shape of the letter "U" laying down on its side.

For example, every four times the memory management part MNG of the input end receives 64-bit write data WD included in a write request, the memory management part MNG of the input end outputs 256 bits of write data WD to the first repeater control part RCNT. That is, the memory management part MNG of the input end converts serial write data WD that arrives from the system bus SBUS, to parallel write data WD, and lets one of the memory blocks MBLK perform a 256-bit write operation.

Based on a read request received at the memory management part MNG of the input end, the memory management part MNG of the output end sends 256 bits of read data RD, output from a memory block MBLK, to the system bus SBUS in 4 times, 64 bits at a time. That is, the memory management part MNG of the output end converts 256 bits of read data RD, read from one of the memory blocks MBLK in the read operation, to serial read data RD, and outputs this serial read data RD to the system bus SBUS.

Note that two memory blocks MBLK, such as the ones illustrated in FIG. 1 may be placed in parallel between the memory management part MNG of the input end and the memory management part MNG of the output end. Then, every eight times the memory management part MNG of the input end receives 64-bit write data WD included in a write request, the memory management part MNG of the input end may output 512 bits of write data WD to the two memory blocks MBLK in parallel. Also, the memory management part MNG of the output end may output 512 bits of read data RD, which is read in parallel from the two memory blocks MBLK based on the read operation, to the system bus SBUS in 8 times, 64 bits of read data RD at a time.

In this way, 256-bit or 512-bit data is processed in parallel inside the memory circuit 100, so that the clock frequency of the memory blocks MBLK can be made approximately ¼ or approximately ⅛ of the clock frequency of the system bus SBUS. Consequently, compared to the case in which 64-bit data is processed one after another within the memory circuit 100, the power consumption of the memory blocks MBLK can be reduced. Since the clock frequency of the memory blocks MBLK can be lowered thus, the operating margin of the repeater control parts RCNT, memory control parts CNT1, and memory parts MEM can be increased, and the timing of the circuit and the like can be designed with ease.

Note that the number of data bits to be input to/output from the memory blocks BLK has only to be 2 to the n-th power of the number of data bits input to/output from the system bus SBUS (where n is an integer greater than or equal to 1; in this example, n=2 or n=3).

Each test circuit BIST operates in test mode, outputs an access request to its corresponding memory control part CNT1, and tests its corresponding memory part MEM. When a test circuit BIST detects a defect through testing, the test circuit BIST stores defect information, including a fail address that specifies the location of the defect and so forth, in the corresponding non-volatile memory NVM. The access request that test circuit BIST outputs here is an example of a first access request.

For example, the non-volatile memory NVM is a memory in which information can be written electrically, such as an eFUSE or a flash memory. Note that the non-volatile memory NVM may be a magnetoresistive random access memory (MRAM) or a resistive random access memory. The defect information stored in the non-volatile memory NVM is retained even when the power to the memory circuit 100 is cut off. The defect information stored in the non-volatile memory NVM is output to the corresponding memory control part CNT1 and to the memory control part CNT2 in the memory management part MNG of the input end.

Note that it is also possible to provide one non-volatile memory NVM that connects with multiple test circuits BIST and multiple memory control parts CNT1 on a shared basis, in the memory circuit 100, instead of the non-volatile memories NVM illustrated in FIG. 1. The functions of the memory control parts CNT1 and test circuits BIST will be described later with reference to FIG. 4 to FIG. 6.

Alternatively, the memory circuit 100 may have no test circuit BIST. In this case, the memory circuit 100 is tested by the test circuit of an LSI tester that is connected to the memory circuit 100, and the test results (fail addresses) are stored in each non-volatile memory NVM. In this case, however, each memory control part CNT1 and the external test circuit need to be connected when the testing is conducted, and so the memory circuit 100 must have an increased number of external terminals.

Each repeater control part RCNT has a selection part SEL. The repeater control parts RCNT operate during normal operation mode and do not operate during test mode. Upon receiving an access request MREQ, the first repeater control part RCNT outputs the received access request MREQ to the next repeater control part RCNT or to a subsequent memory control part CNT1. The repeater control parts RCNT, not including the first and last repeater control parts RCNT, each output a received access request MREQ or read data RD to the next repeater control part RCNT or to a subsequent memory control part CNT1. The last repeater control part RCNT outputs read data RD that is received, to the memory management part MNG of the output end. In this way, the repeater control parts RCNT can transfer access requests MREQ one after another. As used herein, a write request includes a command CMD, an address AD, and write data WD, and a read request includes a command CMD and an address AD.

If an address AD received is one that is assigned to a subsequent memory part MEM, the corresponding selection part SEL outputs the received access request MREQ to a subsequent memory control part CNT1. If an address AD received is not one that is assigned to a subsequent memory part MEM, or if read data RD is received, the corresponding selection part SEL outputs the received access request MREQ or read data RD to the next repeater control part RCNT. The selection part SEL of the last repeater control part RCNT outputs the read data that is received, to the memory control part MNG of the output end.

FIG. 2 illustrates an example of word rescue in each memory part MEM in FIG. 1. As illustrated, the memory parts MEM0 to MEM3 all include 8,190 word lines WL and 2 bubble redundancy word lines BRWL. In the memory part MEM3, 6 word lines WL and 2 bubble redundancy word lines BRWL near the memory management part MNG of the output end function as sub-word lines SWL.

As shown in FIG. 2, the bubble redundancy word lines BRWL are placed in a discrete fashion (as if bubbles were dispersed) between the memory management part MNG of the input end and the memory management part MNG of the output end. By this means, it is possible to operate and test multiple memory parts MEM, independently and in parallel, by using multiple test circuits BIST, so that word line defects can be rescued by using bubble redundancy word lines BRWL.

By this means, even when the memory capacity of the memory circuit 100 is large, testing can be conducted more efficiently, in a shorter period of time. As a result of this, an increase in the manufacturing cost of the memory circuit 100 can be substantially prevented. Note that a word line defect not only refers to a defect of a word line WL itself, but also refers to a defect of a memory cell connected with a word line WL, as shown by the symbols "x" in FIG. 2.

Referring to FIG. 2, the eight sub-word lines SWL are allocated, respectively, in association with the two bubble redundancy word lines BRWL in each of the four memory parts MEM0 to MEM3. When, for example, an address AD that specifies a bubble redundancy word line BRWL is included in an access request MREQ for one of the memory parts MEM0 to MEM3, the memory control part CNT2 in the memory management part MNG at the input end converts the address AD to an address AD that specifies a corresponding sub-word line SWL, as shown by the dotted arrows.

As a result of this, even when bubble redundancy word lines BRWL are placed in a discrete fashion between the memory management part MNG of the input end and the memory management part MNG of the output end, the addresses of word lines assigned in the memory circuit 100 can be made continuous. As a result of this, it is possible to substantially prevent the systems (for example, the user, applications, etc.) that use the memory circuit 100 from damaging the usability of the memory circuit 100.

Figure 3:
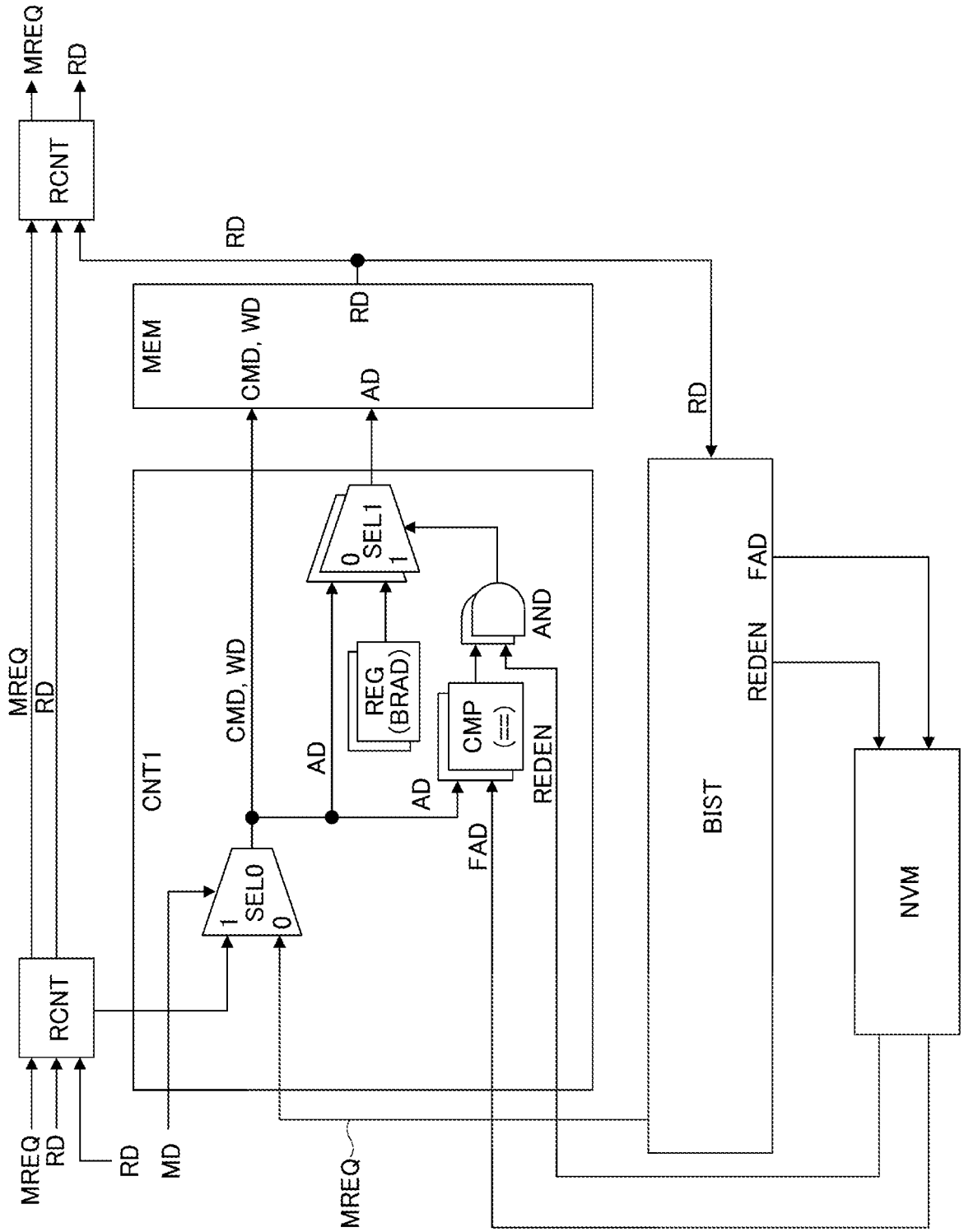
FIG. 3 is a block diagram that illustrates an example of a memory control part CNT1 in FIG. 1.

FIG. 3 illustrates an example of a memory control part CNT1 of FIG. 1. The memory control part CNT1 operates during normal operation mode and test mode. The memory control part CNT1 has selectors SEL0 and SEL1, comparators CMP, AND circuits AND, and registers REG that hold the address BRAD of each bubble redundancy word line BRWL. Note that two comparators CMP, AND circuits AND, registers REG, and selectors SEL1 are provided here, in association with two bubble redundancy word lines BRWL.

When a mode MD indicates test mode (=0), the selector SEL0 selects an access request MREQ that arrives from the test circuit BIST. When the mode MD indicates normal operation mode (=1), the selector SEL0 selects an access request MREQ that arrives from the repeater control part RCNT. The selector SEL0 outputs the command CMD and write data WD (only during the write operation), included in the selected access request MREQ, to the memory part MEM, and outputs the address AD included in access request MREQ to the comparators CMP and the selectors SEL1.

Each comparator CMP compares the address AD from the selector SEL0 and a fail address FAD from the non-volatile memory NVM. Each comparator CMP outputs a high level to the AND circuit AND if the address AD and the fail address FD match, and outputs a low level to the AND circuit AND if the address AD and the fail address FAD do not match. Given that there are two bubble redundancy word lines BRWL, the non-volatile memory NVM may output up to two fail addresses FAD to the two comparators CMP.

When an AND circuit AND receives a high level from its corresponding comparator CMP and receives a high level redundancy enable REDEN, which indicates that the corresponding fail address FAD is valid, the AND circuit AND outputs a high level to the corresponding selector SEL1. When an AND circuit AND receives a low level from its corresponding comparator CMP and receives a low level redundancy enable REDEN, which indicates that the corresponding fail address FAD is not valid, the AND circuit AND outputs a low level to the corresponding selector SEL1.

When each selector SEL1 receives a high level from the corresponding AND circuit AND, that is, when each selector SEL1 rescues a defect by using a bubble redundancy word line BRWL, each selector SEL1 outputs an address BRAD that specifies a bubble redundancy word line BRWL, held in the corresponding register REG, to the memory part MEM. When a selector SEL1 receives a low level from the corresponding AND circuit AND, that is, when the memory cell which an access request MREQ addresses to gain access and the like operates properly, the selector SEL1 outputs an address AD that arrives from the repeater control part RCNT, to the memory part MEM.

The test circuit BIST, which operates during test mode, identifies a defect if the read data RD read from the memory part MEM does not match the expected value (that is, write data WD). If the defect can be rescued using a bubble redundancy word line BRWL, the test circuit BIST stores the fail address FAD, which is the address of the word line WL where the defect is detected, and the high level redundancy enable REDEN, in the non-volatile memory NVM.

Figure 4:
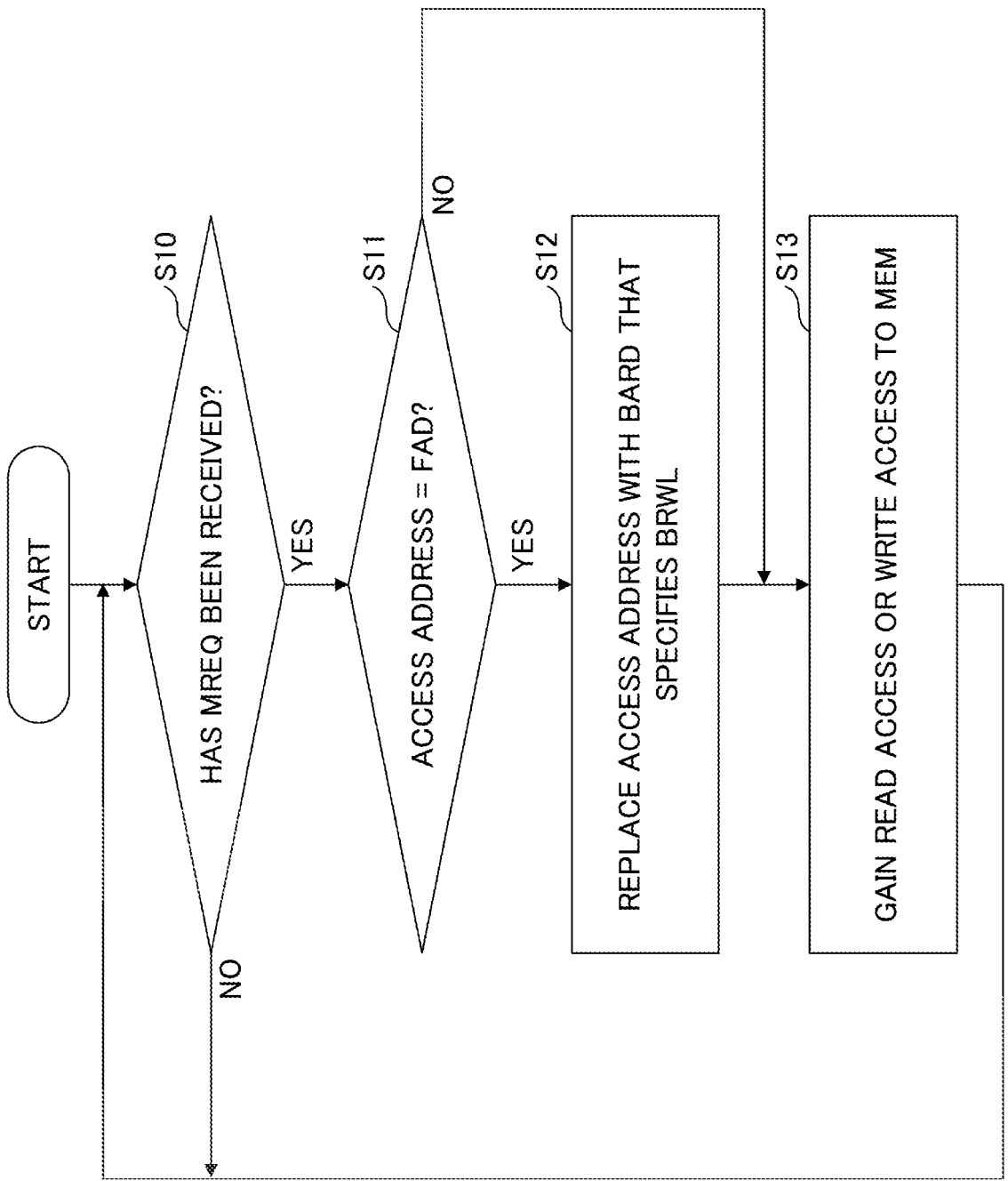
FIG. 4 is a flowchart that illustrates an example operation of the memory control part CNT1 of FIG. 3.

FIG. 4 illustrates an example operation of the memory control part CNT1 of FIG. 3. First, in step S10, the memory control part CNT1 waits until an access request MREQ arrives, and executes step S11 upon arrival of an access request MREQ.

In step S11, the memory control part CNT1 determines whether or not the access address included in the access request MREQ is a fail address FAD. This fail address FAD is an example of a first address, which specifies an inaccessible memory cell. The memory control part CNT1 executes step S12 when the access address is a fail address FAD, and executes step S13 when the access address is not a fail address FAD.

Figure 5:
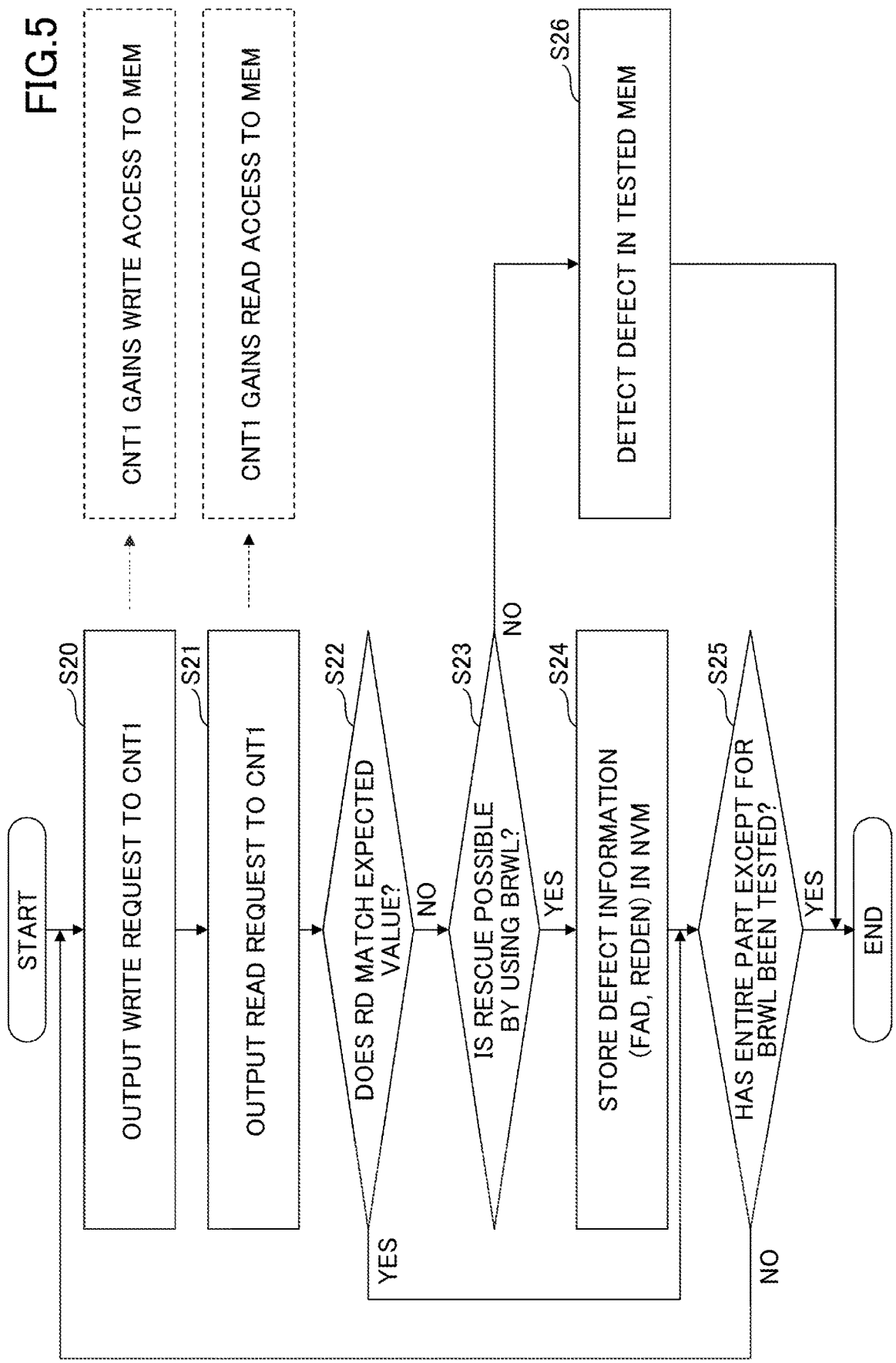
FIG. 5 is a flowchart that illustrates an example of a first test for detecting defects in each memory part, conducted by each test circuit of FIG. 1.

Note that, in the first test illustrated in FIG. 5, since no fail address FAD is stored in the non-volatile memory NVM, in step S11, the memory control part CNT1 determines that the access address is not a fail address FAD.

In step S12, the memory control part CNT1 replaces the access address with an address BRAD that specifies one of the bubble redundancy word lines BRWL. This address BRAD, specifying a bubble redundancy word line BRWL, is an example of a second address. In step S13, the memory control part CNT1 outputs the access address included in the access request MREQ or the address BRAD replaced in step S12 to the memory part MEM, and gains read access or write access to the memory part MEM. The memory control part CNT1 repeats the operation of steps S10 to S13.

FIG. 5 illustrates an example of a first test, in which each corresponding test circuit BIST of FIG. 1 detects defects in a corresponding memory part MEM. For example, the first test illustrated in FIG. 5 is conducted, in parallel, by multiple test circuits BIST.

First, in step S20, the test circuit BIST outputs a write request to the memory control part CNT1. The write request output to the memory control part CNT1 is an example of a first access request. The memory control part CNT1 gains write access to the memory part MEM based on the write request, and writes test data (expected value) in the memory part MEM.

Next, in step S21, the test circuit BIST outputs a read request to the memory control part CNT1. The read request output to the memory control part CNT1 is another example of a first access request. The memory control part CNT1 gains read access to the memory part MEM based on the read request, and reads data from the memory part MEM.

Next, in step S22, the test circuit BIST determines whether or not the read data matches the expected value (that is, the write data in step S20). If the read data matches the expected value, there is no defect, so that the test circuit BIST executes step S25. If the read data does not match the expected value, the test circuit BIST performs step S23 to rescue the defect.

Next, in step S23, the test circuit BIST determines whether the defect can be rescued by using a bubble redundancy word line BRWL. The test circuit BIST executes step S24 if the defect can be rescued, and executes step S26 if the defect cannot be rescued. An example in which a defect cannot be rescued is when no bubble redundancy word line BRWL is available. In step S24, the test circuit BIST stores a fail address FAD and a redundancy enable REDEN (=1), in association with the bubble redundancy word line BRWL that is used to rescue the defect, in the non-volatile memory NVM, and executes step S25. In step S25, when the entire part of the memory part MEM except for the bubble redundancy word lines BRWL is tested, the test circuit BIST ends the operation of FIG. 5. If there is an untested part in the memory part MEM, the test circuit BIST returns to step S20.

In step S26, the test circuit BIST determines that there is a defect in the tested memory part MEM that cannot be rescued by using a bubble redundancy word line BRWL, and ends the operation of FIG. 5.

Figure 6:
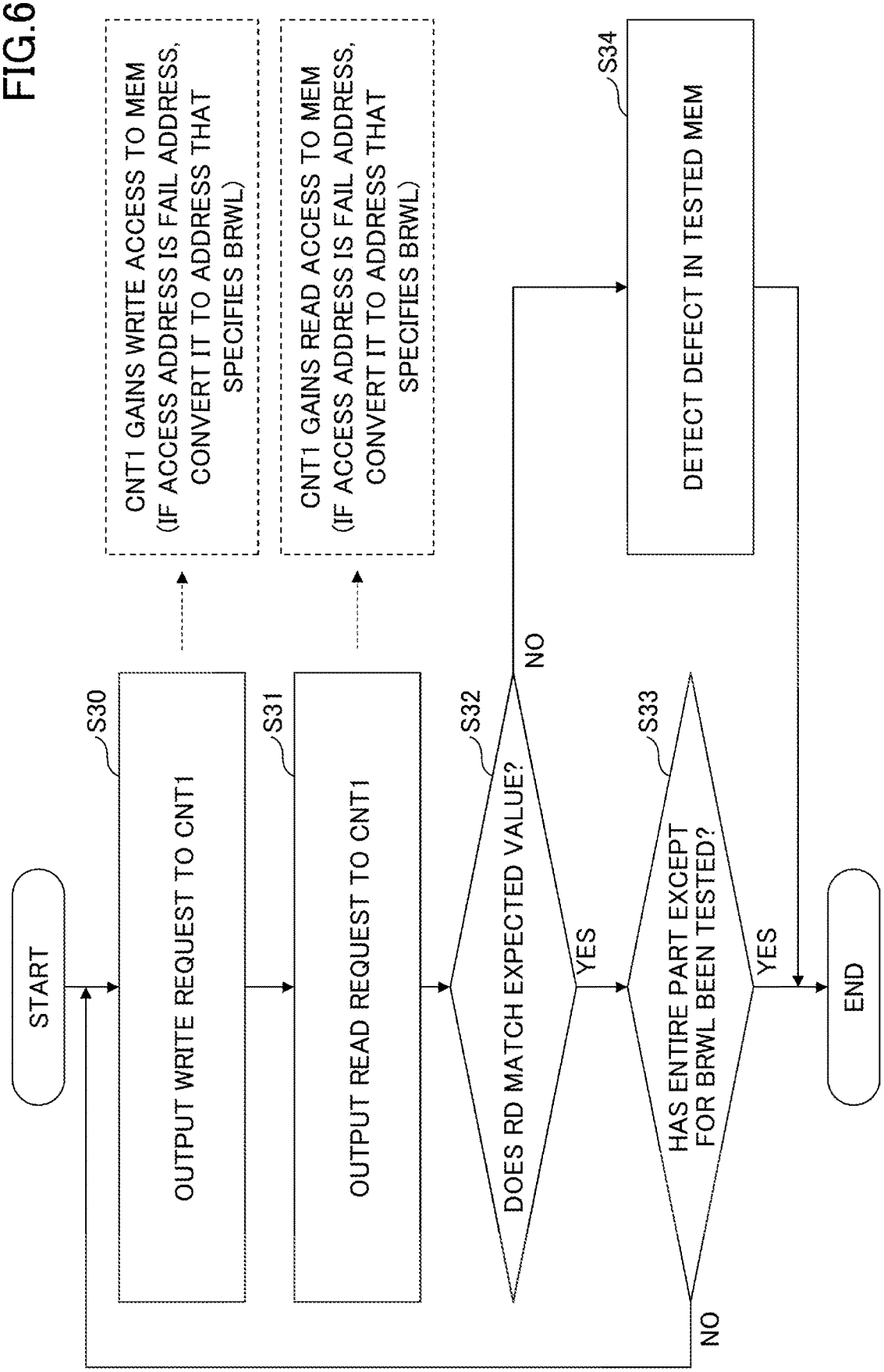
FIG. 6 is a flowchart that illustrates an example of a second test for checking the operation of each memory part, conducted by each test circuit of FIG. 1 after defect information is stored in a non-volatile memory.

FIG. 6 illustrates an example of a second test in which each test circuit BIST of FIG. 1 checks the operation of the corresponding memory part MEM after defect information is stored in the non-volatile memory NVM. For example, the second test illustrated in FIG. 6 is conducted in parallel in multiple test circuits BIST and multiple memory control parts CNT1.

First, in step S30, the test circuit BIST outputs a write request to the memory control part CNT1, as in step S20 of FIG. 5. If the address included in the write request matches the fail address FAD stored in the non-volatile memory NVM, the memory control part CNT1 converts the address included in the write request to an address BRAD that specifies a bubble redundancy word line BRWL, gains write access to the memory part MEM, and writes the test data (expected value) in the memory part MEM. If the access address included in the write request and the fail address FAD stored in the non-volatile memory NVM do not match, the memory control part CNT1 gains write access to the memory part MEM by using the address included in the write request, and writes the test data (expected value) in the memory part MEM.

Next, in step S31, as in S21 of FIG. 5, the test circuit BIST outputs a read request to the memory control part CNT1. As when a write request arrives, if the address included in the read request and the fail address FAD match, the memory control part CNT1 converts the address included in the read request to an address BRAD that specifies a bubble redundancy word line BRWL, and gains read access to the memory part MEM. If the address included in the read request and the fail address FAD do not match, the memory control part CNT1 gains write access to the memory part MEM by using the address included in the read request.

Next, in step S32, the test circuit BIST determines whether the read data matches the expected value, as in step S22 of FIG. 5. If the read data matches the expected value, the test circuit BIST determines that the operation is proper, and executes step S33. If the read data and the expected value do not match, the test circuit BIST determines that there is a defect, and executes step S34.

In step S33, as in step 25 of FIG. 5, the test circuit BIST ends the operation of FIG. 6 when the entire part of the memory part MEM except for the bubble redundancy word line BRWL is tested, and returns to step S30 if there is an untested part in the memory part MEM.

In step S34, as in step S26 of FIG. 5, the test circuit BIST determines that there is a defect in the tested memory part MEM that cannot be rescued, and ends the operation of FIG. 6.

As illustrated in FIG. 5 and FIG. 6, multiple test circuits BIST conduct the first and second tests on multiple memory parts MEM one after another, so that it is possible to detect defects in multiple memory parts MEM, and obtain a confirmation after the defects are rescued, in parallel.

FIG. 7 illustrates an example operation of the memory control part CNT2 upon receipt of an access request MREQ via the system bus SBUS. FIG. 7 illustrates an operation that the memory circuit 100 executes during normal operation mode.

First, in step S40, the memory control part CNT2 waits until the memory management part MNG receives an access request MREQ. When the memory management part MNG receives an access request MREQ, the memory control part CNT2 executes step S41.

In step S41, the memory control part CNT2 determines whether or not the access address included in the access request MREQ is an address BRAD that specifies a bubble redundancy word line BRWL. The memory control part CNT2 executes step S42 if the access address is an address BRAD, and executes step S43 if the access address is not an address BRAD.

In step S42, the memory control part CNT2 converts the access address to an address that specifies a sub-word line SWL in the memory part MEM3, and executes step S43. This address specifying a sub-word line SWL is an example of a third address. In step S43, the memory control part CNT2 outputs an access request to the first repeater control part RCNT. The memory control part CNT2 repeats the operation of steps S40 to S43.

Figure 8:
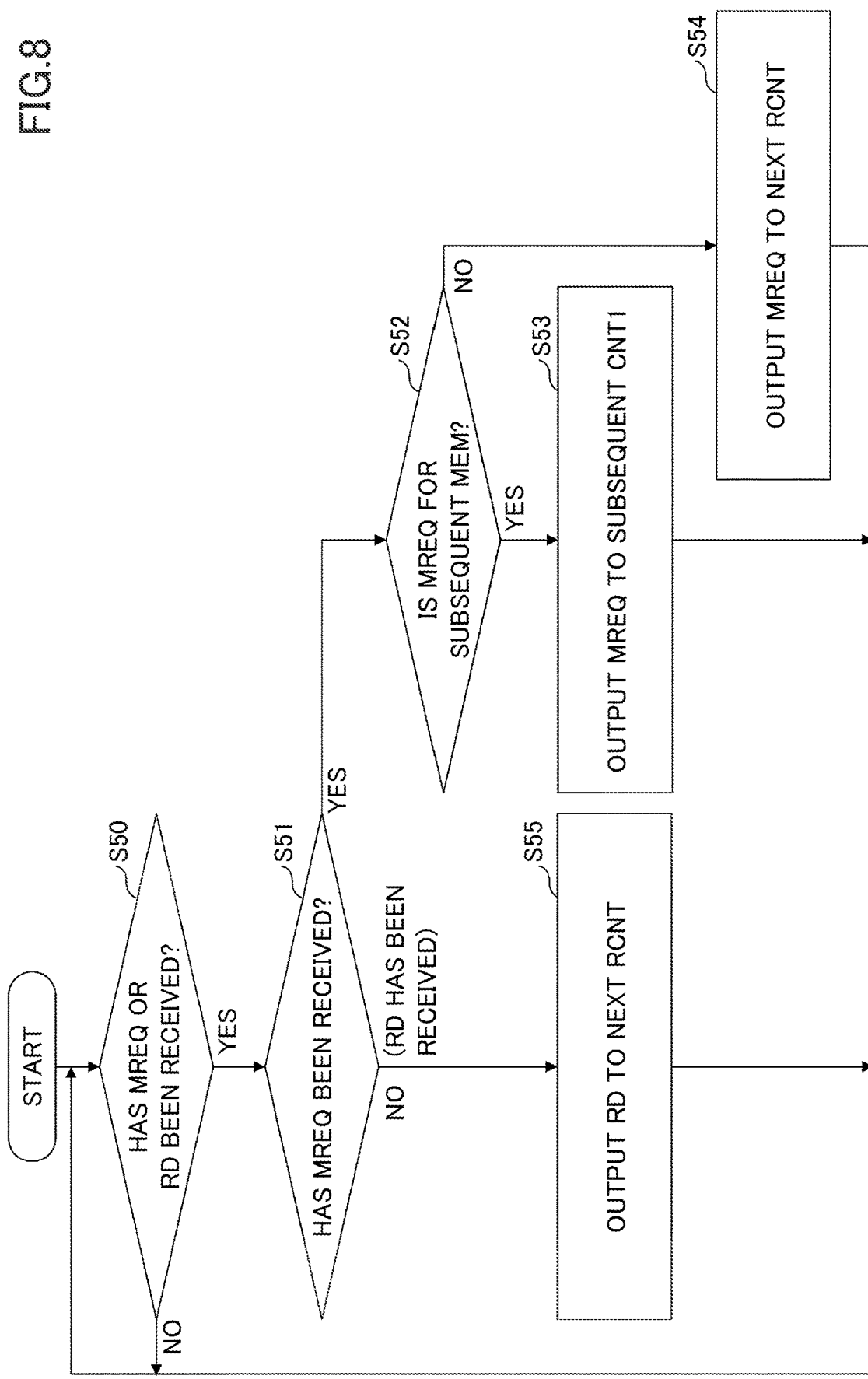
FIG. 8 is a flowchart that illustrates an example operation of a branch control unit, not including the last step.

FIG. 8 illustrates an example operation of the repeater control part RCNT, not including the last step. FIG. 8 illustrates an operation that the repeater control part RCNT executes during normal operation mode. Note that the last repeater control part RCNT receives a read request and read data RD together, and outputs the received read data RD to the memory management part MNG of the output end.

First, in step S50, the repeater control part RCNT waits until an access request MREQ or read data RD arrives. When an access request MREQ or read data RD arrives, step S51 is executed. The access request MREQ is supplied from the memory management part MNG of the input end or from the preceding repeater control part RCNT. The read data RD is supplied from the preceding repeater control part RCNT.

In step S51, the repeater control part RCNT executes step S52 if an access request MREQ is received. If no access request MREQ is received, the repeater control part RCNT still receives read data RD, and therefore executes step S55.

In step S52, the repeater control part RCNT determines whether the received access request MREQ addresses the immediately-subsequent memory part MEM. The repeater control part RCNT performs step S53 if the access request MREQ addresses the subsequent memory part MEM, and performs step S54 if the access request MREQ does not address the subsequent memory part MEM.

In step S53, the repeater control part RCNT outputs the access request MREQ to the subsequent memory control part CNT1, and the operation returns to step S50. In step S54, the repeater control part RCNT outputs the access request MREQ to the next repeater control part RCNT, and the operation returns to step S50.

In step S55, the repeater control part RCNT outputs the read data RD to the next repeater control part RCNT, and the operation returns to step S50.

Thus, according to the first embodiment, it is possible to access and test multiple memory parts MEM in parallel during test mode, so that, during normal operation mode, the multiple memory parts MEM can be accessed as one memory. As a result of this, it is possible to provide a memory circuit 100 that can operate as multiple small-capacity memories and as a large-capacity memory by switching its operation mode.

When an address AD that specifies a bubble redundancy word line BRWL is included in an access request MREQ, the memory control part CNT2 converts the address AD to an address AD that specifies a corresponding sub-word line SWL. By this means, even if bubble redundancy word lines BRWL are arranged in a discrete fashion, the addresses AD of word lines allocated in the memory circuit 100 can be made continuous. As a result of this, it is possible to substantially prevent reduced usability of the memory circuit 100 for systems that use the memory circuit 100.

By providing test circuits BIST and bubble redundancy word lines BRWL on a per memory part MEM (memory block MBLK) basis, it is possible to operate and test multiple memory parts MEM in parallel. Also, since multiple test circuits BIST perform the first and second tests on multiple memory parts MEM one after another, it is possible to detect defects in multiple memory parts MEM, and obtain a confirmation after the defects are rescued, in parallel. By this means, even when the memory capacity of the memory circuit 100 is large, testing can be conducted more efficiently, in a shorter period of time. As a result of this, an increase in the manufacturing cost of the memory circuit 100 can be substantially prevented.

If an access request MREQ does not request access to the subsequent memory block MBLK, the repeater control part RCNT bypasses the memory block MBLK and transfers the access request MREQ to the next repeater control part RCNT. By this means, it is possible to substantially prevent a command line CMD, address line AD, write data line WD, and read data line DT from being wired through multiple memory blocks BLK. As a result of this, it is possible to substantially prevent an increase in the burden of wiring, an increase in the time it takes to access the memory circuit 100, and an increase in power consumption.

Figure 9:
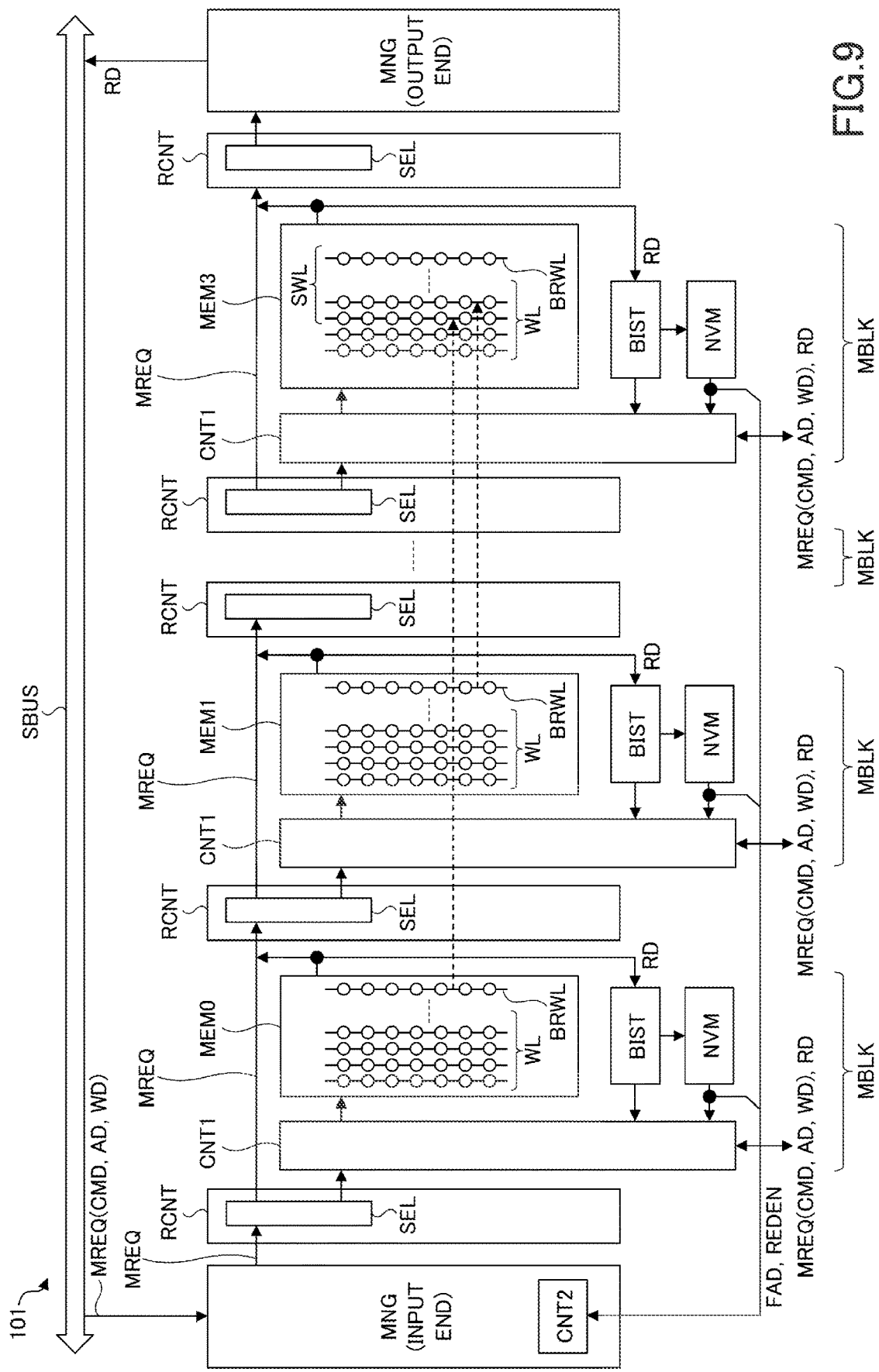
FIG. 9 is a block diagram that illustrates an overview of a memory circuit according to a second embodiment.

FIG. 9 illustrates an overview of a memory circuit according to a second embodiment. Below, elements that are similar to or the same as those in FIG. 1 will be assigned the same reference numerals, and their detailed description will be omitted. Referring to FIG. 9, the memory circuit 101 can read and write data from and to the memory parts MEM in parallel, from outside, during normal operation modes. The structure and functions of the memory circuit 101 are the same as those of the memory circuit 100 of FIG. 1, except that the memory control parts CNT1 has additional functions.

That is, each memory control part CNT1 has a function to receive an access request MREQ (CMD, AD, and WD) from outside the memory circuit 101, and a function to output read data RD to the outside of the memory circuit 101. Note that each memory control part CNT1 may receive an access request MREQ via the system bus SBUS. The access request output from each test circuit BIST and the access request MREQ that each memory control part CNT1 receives are examples of first access requests.

The normal operation modes in this embodiment include a first normal operation mode, in which the memory parts MEM can be accessed in parallel as small-capacity memories, and a second normal operation mode, in which all the memory parts MEM can be accessed as one large-capacity memory. In the first normal operation mode, an access request MREQ is delivered to each memory control part CNT1. In the second normal operation mode, an access request MREQ is delivered to the memory management part MNG of the input end. The first normal operation mode is an example of a first mode, and the second normal operation mode is an example of a second mode.

Figure 10:
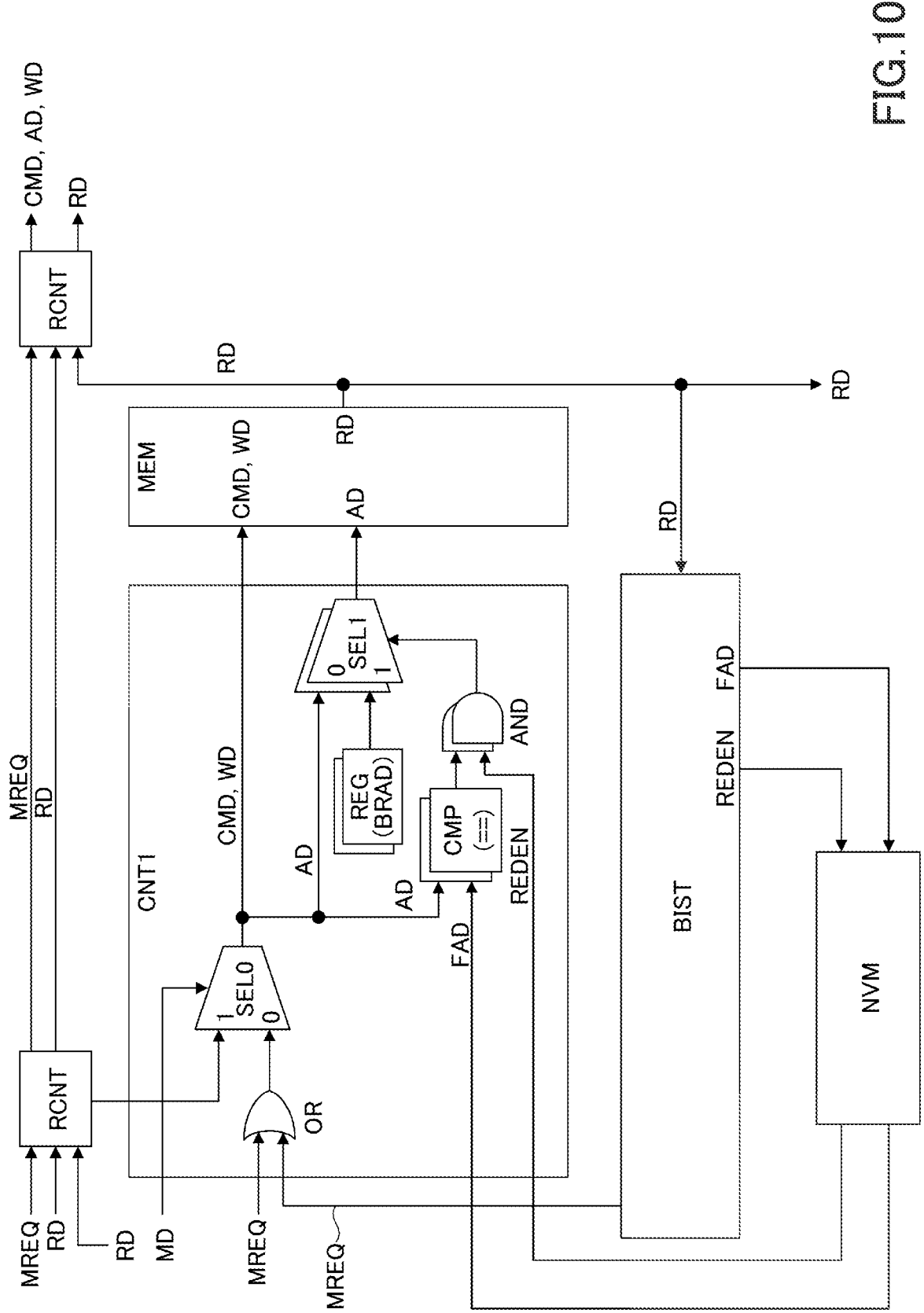
FIG. 10 is a block diagram that illustrates an example of a memory control part CNT1 in FIG. 9.

FIG. 10 illustrates an example of the memory control part CNT1 of FIG. 9. Below, elements that are similar to or the same as those in FIG. 3 will be assigned the same reference numerals, and their detailed description will be omitted. The memory control part CNT1 illustrated in FIG. 10 has the same structure as the memory control part CNT1 of FIG. 3, except that an OR circuit OR is added to the memory control part CNT1 of FIG. 1.

The OR circuit OR outputs an access request MREQ from the test circuit BIST or an access request MREQ from outside the memory circuit 101, to the selection part SEL0. The functions of the memory control part CNT1 illustrated in FIG. 10 are the same as those of the memory control part CNT1 of FIG. 3, except that the memory part MEM can be accessed not only based on an access request MREQ from the repeater control part RCNT, but also based on an access request MREQ from outside the memory circuit 101, during normal operation modes. Note that read data RD that is output from the memory part MEM based on an access request MREQ (read request) received during normal operation modes is output to the repeater control part RCNT and to the outside of the memory circuit 101.

Figure 11:
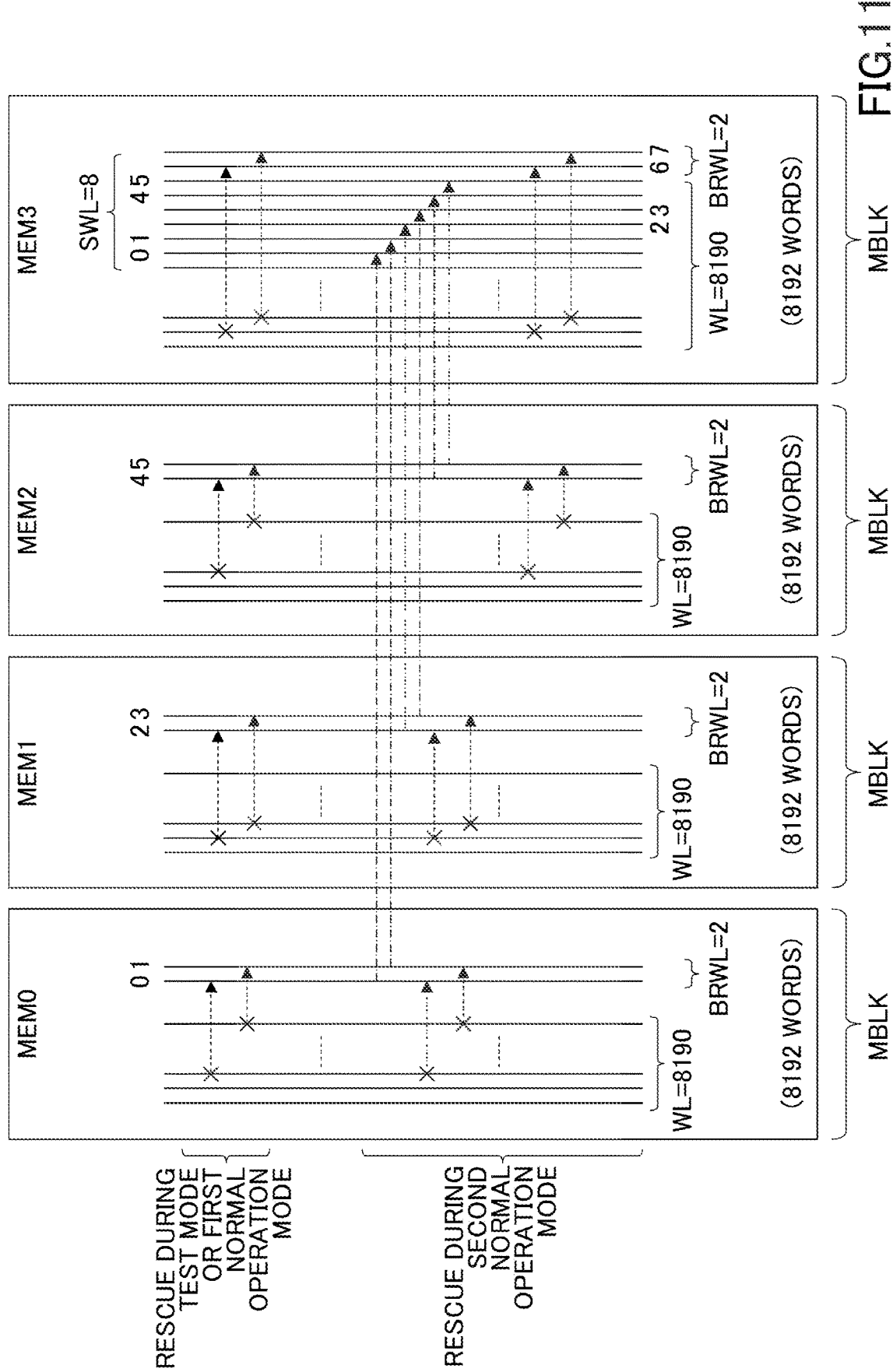
FIG. 11 is a diagram for explaining an example of word rescue in each memory block in FIG. 9.

FIG. 11 illustrates an example of word rescue in the memory blocks of FIG. 9. Parts of the operation that are similar to or the same as those in FIG. 2 will not be described in detail. For example, the memory parts MEM0 to MEM3 all include 8,190 word lines WL and 2 bubble redundancy word lines BRWL, as in FIG. 2. 6 word lines WL and 2 bubble redundancy word lines BRWL in the memory part MEM3 function as sub-word lines SWL.

During the test mode and the first normal operation mode, defects in each memory part MEM are rescued independently, per memory part MEM. Also, in the first normal operation mode, the process of converting the addresses of bubble redundancy word lines BRWL in the memory parts MEM0 to MEM2, to the addresses of sub-word lines SWL in the memory part MEM3 of the memory block MBLK1, is not performed. Word rescue during the second normal operation mode is executed in the same manner as in FIG. 2. In other words, when an address included in an access request MREQ specifies a bubble redundancy word line BRWL, the address included in the access request MREQ is converted to an address that specifies a corresponding sub-word line SWL, as shown by the dotted arrows.

Thus, as described above, the second embodiment can provide the same advantages as those provided by the first embodiment. For example, during the test mode, it is possible to access and test multiple memory parts MEM in parallel, so that the testing can be conducted more efficiently, in a shorter period of time. As a result of this, an increase in the manufacturing cost of the memory circuit 101 can be substantially prevented.

Furthermore, according to the second embodiment, the memory circuit 101 has a first normal operation mode, in which multiple memory parts MEM can be accessed in parallel as small-capacity memories, and a second normal operation mode, in which multiple memory parts MEM can be accessed as one large-capacity memory. By this means, it is possible to provide a memory circuit 101 that can operate as multiple small-capacity memories and as a large-capacity memory by switching its operation mode.

Figure 12:
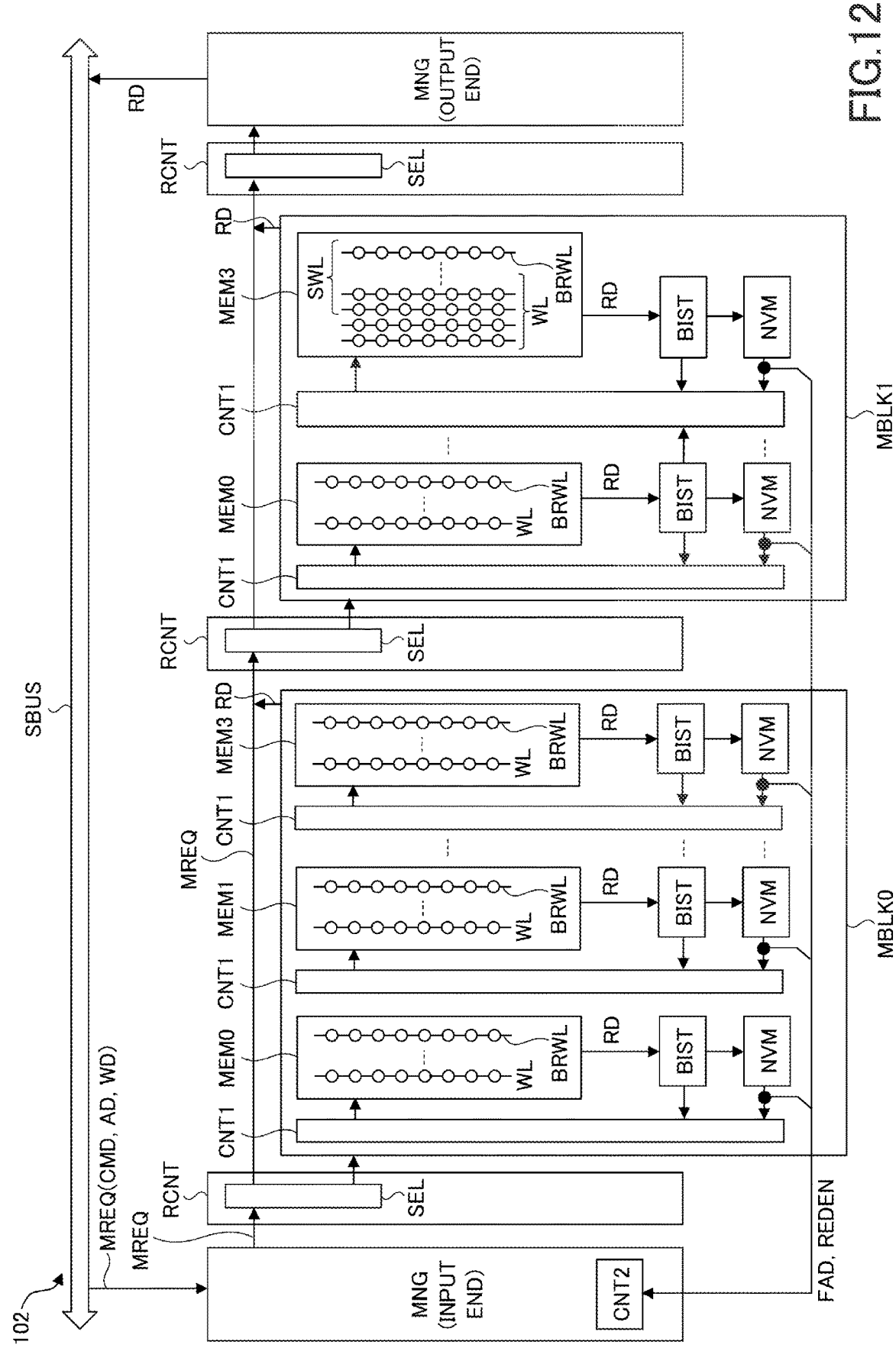
FIG. 12 is a block diagram that illustrates an overview of a memory circuit according to a third embodiment.

FIG. 12 illustrates an overview of a memory circuit according to a third embodiment. Below, elements that are similar to or the same as those in FIG. 1 will be assigned the same reference numerals, and their detailed description will be omitted. The memory circuit 102 illustrated in FIG. 12 includes: three repeater control parts RCNT, which are placed between the memory management part MNG of the input end and the memory management part MNG of the output end; and memory blocks MBLK (MBLK0 and MBLK1), which are placed between two neighboring repeater control parts RCNT.

Each memory block MBLK includes 4 memory parts MEM (MEM0 to MEM3). The memory parts MEM0 to MEM3 in each of the memory block MBLK0 and MBLK1 include multiple word lines WL and a predetermined number of bubble redundancy word lines BRWL, as in each memory part MEM in FIG. 1.

Also, as in the memory part MEM3 of FIG. 1, a predetermined number of word lines WL and the bubble redundancy word line BRWL in the memory part MEM3 of the memory block MBLK1 function as sub-word lines SWL. As in FIG. 2, the sub-word lines SWL are provided in association with the bubble redundancy word lines BRWL in the memory parts MEM. When an address AD indicated in an access request MREQ specifies a bubble redundancy word line BRWL, the memory control part CNT2 of the memory management part MNG of the input end converts the address AD to an address AD that specifies a corresponding sub-word line SWL.

As described earlier with reference to FIG. 2, in testing the memory circuit 102, the multiple memory parts MEM0 to MEM3 of the memory blocks MBLK can be tested independently and in parallel by using multiple test circuits BIST. The method for rescuing word lines WL in the memory circuit 102 is the same as the method described earlier with reference to FIG. 2, except that the addresses of the bubble redundancy word lines in the memory parts MEM0 to MEM3 of the memory block MBLK0 and in the memory parts MEM0 to MEM2 of the memory block MBLK1 are converted to addresses that specify sub-word lines SWL in the memory part MEM3 of the memory block MBLK1.

If an access address that specifies a bubble redundancy word line BRWL is included in an access request MREQ, the memory control part CNT2 of this embodiment converts the access address to an address that specifies one of the sub-word lines SWL included in the memory part MEM3 of the memory block MBLK1. The memory control part CNT2 outputs the converted address to the first repeater control part RCNT. If the access address included in the access request MREQ does not specify a bubble redundancy word line BRWL, the memory control part CNT2 outputs the access address to the first repeater control part RCNT without converting it.

The memory circuit 102 may include five repeater control parts RCNT and four memory blocks MBLK. Each memory block MBLK may be placed between two neighboring repeater control parts RCNT. The method of rescuing word lines WL in this case is the same as the method illustrated in FIG. 2, except that each memory block MBLK has 4 memory parts MEM0 to MEM3. The number of repeater control parts RCNT and memory blocks MBLK is by no means limited to this example.

Thus, as described above, the third embodiment can provide the same advantages as those of the first embodiment. Furthermore, according to the third embodiment, each memory block MBLK includes multiple memory parts MEM, and each memory part MEM has a memory control part CNT1, a test circuit BIST, and a non-volatile memory NVM associated therewith. As a result of this, the memory capacity, which is the unit in which testing is conducted, can be made smaller than in the first embodiment. As a result of this, testing can be conducted more efficiently, in a shorter period of time, than in the first embodiment.

Figure 13:
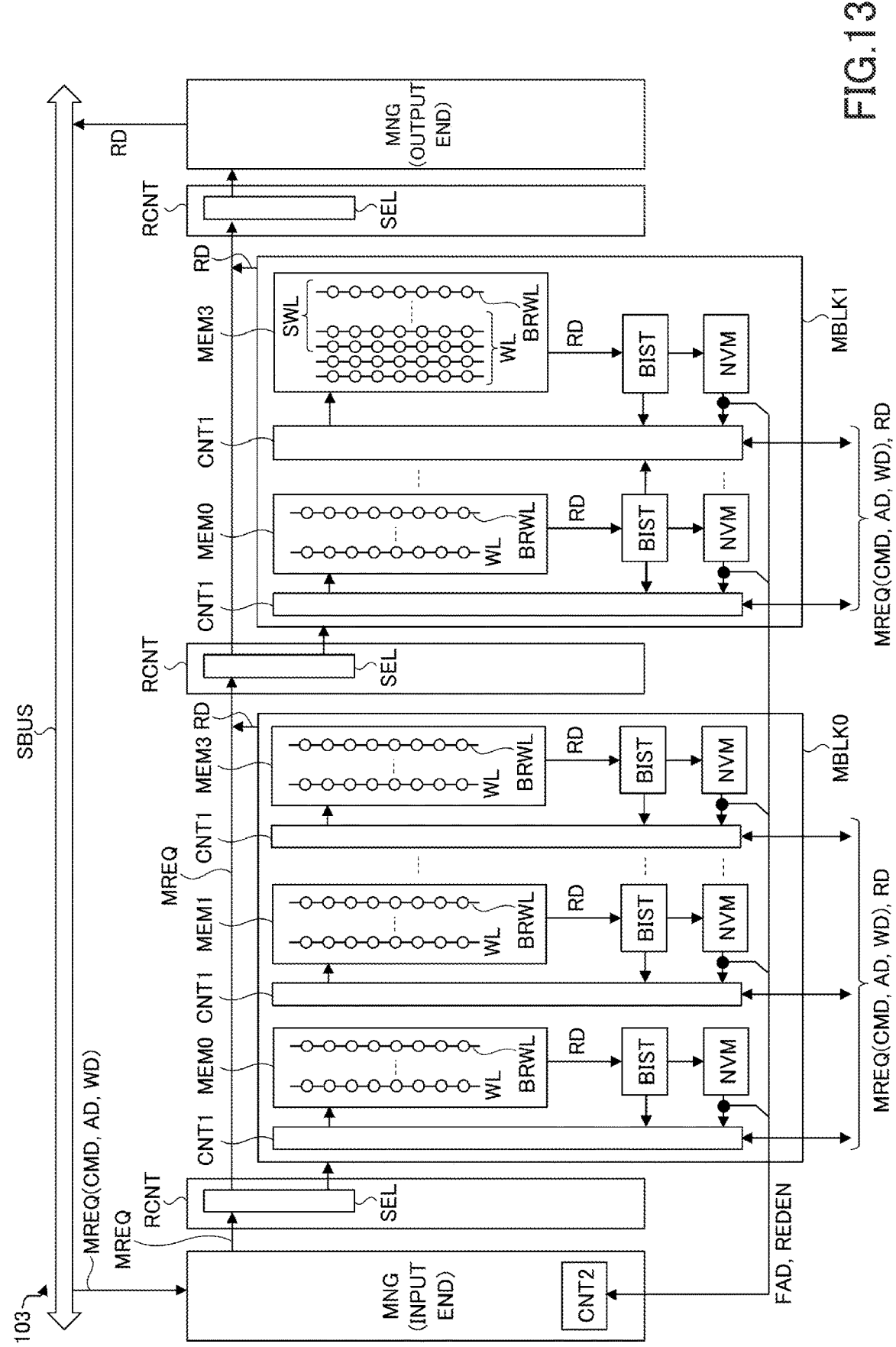
FIG. 13 is a block diagram that illustrates an overview of a memory circuit according to a fourth embodiment.

FIG. 13 illustrates an overview of a memory circuit according to a fourth embodiment. Below, elements that are similar to or the same as those in FIG. 1, FIG. 9, and FIG. 12 will be assigned the same reference numerals, and their detailed description will be omitted. The memory circuit 103 illustrated in FIG. 13 is similar to or the same as the memory circuit 102 of FIG. 12 in structure and functions, except that, as in the memory circuit 101 illustrated in FIG. 9, data can be read from and written to the memory parts MEM in parallel, from outside, during normal operation modes.

Again, the normal operation modes of the memory circuit 103 illustrated in FIG. 13 include a first normal operation mode, in which the memory parts MEM can be accessed in parallel as small-capacity memories, and a second normal operation mode, in which all the memory parts MEM can be accessed as one large-capacity memory. In the first normal operation mode, an access request MREQ is delivered to each memory control part CNT1. In the second normal operation mode, an access request MREQ is delivered to the memory management part MNG of the input end. The method of rescuing words in the test mode, the first normal operation mode, and the second normal operation mode is the same as in FIG. 11, except that each memory block MBLK includes multiple memory parts MEM.

Thus, as described above, the fourth embodiment can provide the same advantages as those provided by the first embodiment.

Figure 14:
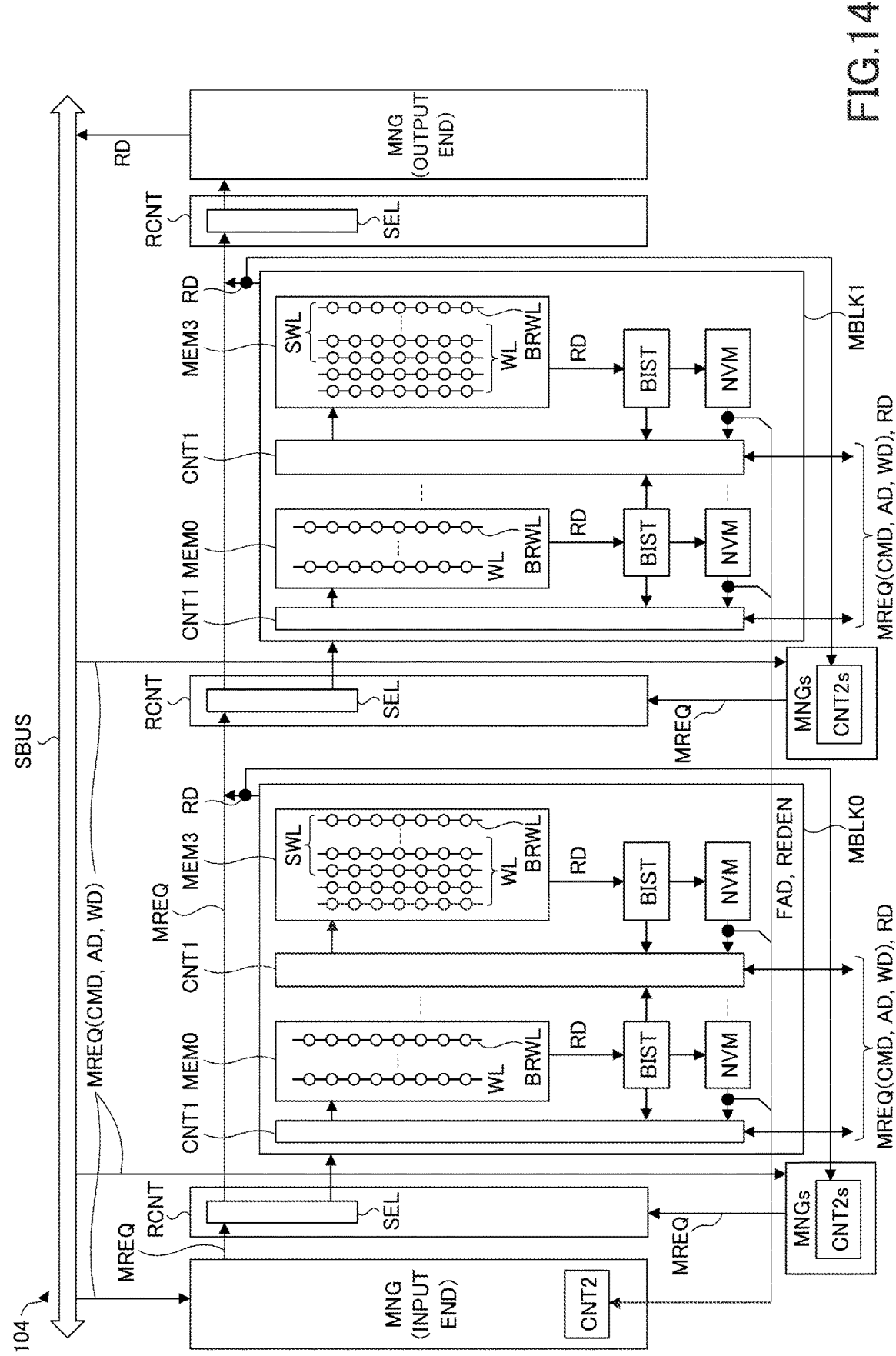
FIG. 14 is a block diagram that illustrates an overview of a memory circuit according to a fifth embodiment.

FIG. 14 illustrates an overview of a memory circuit according to a fifth embodiment. Below, elements that are similar to or the same as those in FIG. 1, FIG. 9, FIG. 12, and FIG. 13 will be assigned the same reference numerals, and their detailed description will be omitted. The memory circuit 104 illustrated in FIG. 14 includes: multiple memory blocks MBLK (MBLK0 and MBLK1), having a similar or the same structure as the memory block MBLK1 of FIG. 13; and sub-memory management parts MNGs, provided in association with respective memory blocks MBLK. The same structure and functions of the memory circuit 104, not including the memory blocks MBLK and the sub-memory management parts MNGs, are similar to or the same as those of the memory circuit 103 illustrated in FIG. 13, except that the repeater control parts RCNT are provided with an additional function to receive access requests MREQ from the sub-memory management parts MNGs.

The memory circuit 104 has a third normal operation mode, in addition to the first and normal operation modes that are similar to or the same as those of the memory circuit 101 of FIG. 9. In the first normal operation mode, the memory parts MEM can be accessed in parallel as small-capacity memories. In the second normal operation mode, all the memory parts MEM can be accessed as one large-capacity memory. In the third normal mode, the memory blocks MBLK can be accessed in parallel as medium-capacity memories. By this means, it is possible to provide a memory circuit 104 that can operate as multiple small-capacity memories, multiple medium-capacity memories, or a large-capacity memory, by switching its operation mode.

Like each memory part MEM in FIG. 1, the memory parts MEM0 to MEM2 in the memory blocks MBLK all include multiple word lines WL and a predetermined number of bubble redundancy word lines BRWL. In the memory part MEM3 of each memory block BLK, as in the memory part MEM3 of FIG. 1, a predetermined number of word lines WL and a bubble redundancy word line BRWL function as sub-word lines SWL. Then, every bubble redundancy word line BRWL's address is converted to an address of a sub-word line SWL in the memory part MEM3, in each memory block MBLK.

A sub-memory management part MNGs is a subset of the memory management part MNG of the input end, and its range of conversion of addresses AD is different. That is, while the address conversion by the memory management part MNG of the input end spans multiple memory blocks MBLKs, the address conversion by each sub-memory management part MNGs is carried out only within the corresponding memory block MBLK. Each sub-memory management part MNGs operates during the third normal operation mode, in which access requests MREQ arrive from the system bus SBUS, and outputs the received access requests MREQ to the corresponding repeater control part RCNT. Each sub-memory management part MNGs has a sub-memory control part CNT2s, which is equivalent to a memory control part CNT2.

Each sub-memory control part CNT2s knows the bubble redundancy word lines BRWL in multiple memory parts MEM by referencing the defect information stored in the non-volatile memories NVM in the corresponding memory block MBLK, or from the specification. The sub-memory control part CNT2s determines to which memory part MEM an access request MREQ is transferred, and converts the address AD included in the access request MREQ to an address AD for the MEM of the transfer destination determined.

When an address AD that specifies a bubble redundancy word line BRWL is included in an access request MREQ, each sub-memory control part CNT2s converts the address AD to an address AD that specifies a sub-word line SWL in the corresponding memory block MBLK. By this means, in the third normal operation mode, the memory parts MEM0 to MEM3 in each memory block MBLK can be used as a part where the addresses AD are continuous.

The method of rescuing words in the test mode, the first normal operation mode, the second normal operation mode, and the third normal operation mode is similar to or the same as in FIG. 11, except that each memory block MBLK has multiple memory parts MEM. However, if, in the second normal operation mode, an address AD that is indicated in an access request MREQ specifies a bubble redundancy word line BRWL, the memory control part CNT2 converts this address AD to an address AD that specifies a corresponding sub-word line SWL in the memory part MEM3 of the memory block MBLK1. In the third normal operation mode, when an address AD indicated in an access request MREQ specifies a bubble redundancy word line BRWL, each sub-memory control part CNT2s converts the address AD to an address AD that specifies a corresponding sub-word line SWL in the memory part MEM3 of the corresponding memory block MBLK. Note that, in the event bubble redundancy word lines BRWL allow discrete assignment of addresses AD, the sub-memory control parts CNT2s do not have to convert addresses AD to addresses AD that specify sub-word lines SWL.

Thus, as described above, the fifth embodiment can provide the same advantages as those provided by the first to fourth embodiments. Furthermore, according to this embodiment, it is possible to provide a memory circuit 104 that can operate as multiple small-capacity memories, multiple medium-capacity memories, or a large-capacity memory by switching its operation mode.

Figure 15:
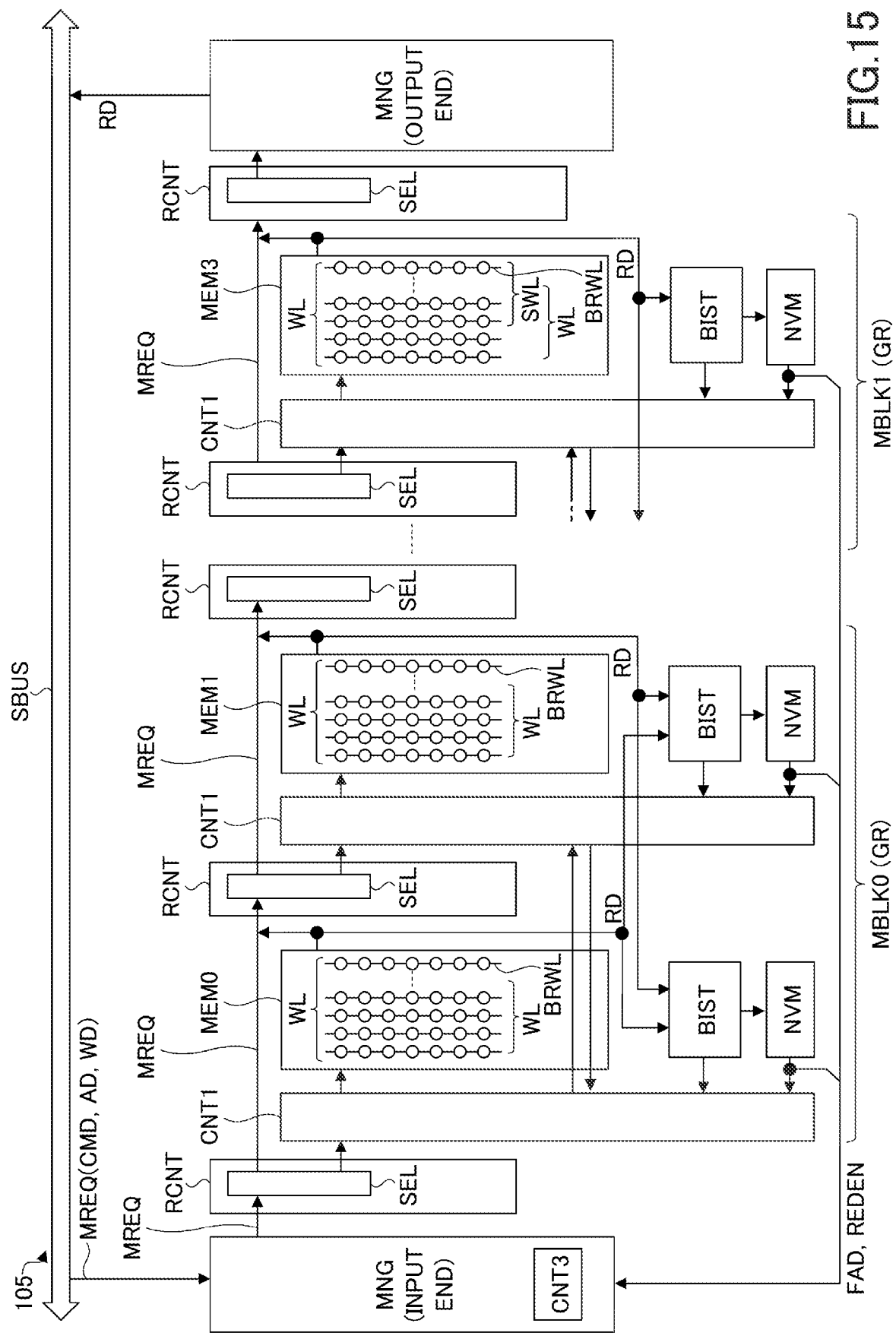
FIG. 15 is a block diagram that illustrates an overview of a memory circuit according to a sixth embodiment.

FIG. 15 illustrates an overview of a memory circuit according to a sixth embodiment. Below, elements that are similar to or the same as those in FIG. 1 and FIG. 12 will be assigned the same reference numerals, and their detailed description will be omitted. The memory circuit 105 illustrated in FIG. 14 has multiple repeater control parts RCNT, as in FIG. 1. Also, in the memory circuit 105, a memory control part CNT1, a memory part MEM (MEM0, MEM1, MEM2, or MEM3), a test circuit BIST, and a non-volatile memory NVM are placed between two neighboring repeater control parts RCNT. According to this embodiment, a group GR, including two sets of memory control parts CNT1, memory parts MEM, test circuits BIST, and non-volatile memories NVM, is assigned to each memory block MBLK (MBLK0 or MBLK1).

According to this embodiment, when testing one memory part MEM in each memory block MBLK (that is, each group GR), a word line WL in the other memory part MEM is used as a redundancy word line. That is, during test mode, in each group GR, a defect in one memory part MEM is rescued by using a word line WL in the other memory part MEM.

Bubble redundancy word lines BRWL are used only in normal operation mode. In the memory part MEM3, multiple word lines WL near the memory management part MNG of the output end and a predetermined number of bubble redundancy word lines BRWL function as sub-word lines SWL. The method of rescuing defects by using bubble redundancy word lines BRWL and the method of using sub-word lines SWL in normal operation mode are similar to or the same as in the first and second embodiments.

For example, during test mode, a defective word line WL in one memory part MEM is replaced with a word line WL having the same number (that is, the same word line address) as that of the defective word line WL in the other memory part MEM. By this means, testing of the memory circuit 105 can be conducted per group GR, independently, and multiple groups GR can be tested in parallel. In testing each group GR, first, one memory part MEM is tested, and then the other memory part MEM is tested.

The memory cell (circular symbols) associated with each word line WL is an example of a first memory cell. The memory cell (circular symbols) associated with each bubble redundancy word line BRWL is an example of a second memory cell. In FIG. 13, the memory circuit 105 has five repeater control parts RCNT and two memory blocks MBLK, but the number of repeater control parts RCNT and memory blocks BMLK is by no means limited to this example.

Each test circuit BIST stores, in its corresponding non-volatile memory NVM, a fail address that specifies a word line WL where a defect is detected in the first test for detecting defects in each memory part MEM. Also, each test circuit BIST performs a second test, in which each test circuit BIST of FIG. 1 checks the operation of the corresponding memory part MEM after defect information is stored in the non-volatile memory NVM. That is, each test circuit BIST can store defect information in a non-volatile memory NVM based on the result of the first test, and then perform a second test to check the operation of each memory part MEM.

In the second test, each memory control part CNT1 can transfer an access request MREQ to the other memory control part CNT1 in the group GR, according to the fail address stored in the non-volatile memory NVM. Each test circuit BIST can receive read data RD from both of the pair of memory parts MEM.

FIG. 16 illustrates an example of word rescue in the memory blocks MBLK of FIG. 15. For example, the memory parts MEM0 to MEM3 all have 8, 192 word lines. As illustrated in FIG. 2, during normal operation mode, defects in each memory part MEM are rescued using bubble redundancy word lines BRWL. Also, the eight sub-word lines SWL are allocated in association with two bubble redundancy word lines BRWL in each of the four memory parts MEM0 to MEM3. When an address that specifies a bubble redundancy word line BRWL is included in an access request MREQ, the address is converted to one that specifies a corresponding sub-word line SWL, as shown by the dotted arrows.

For example, during test mode, defects in the memory part MEM0, indicated by the X symbols, are rescued by using word lines WL in the memory part MEM1. Defects in the memory part MEM1, also indicated by the X symbols, are rescued by using word lines WL in the memory part MEM0. Likewise, during test mode, defects in the memory part MEM2, indicated by the X symbols, are rescued by using word lines WL in the memory part MEM3. Defects in the memory part MEM3, also indicated by the X symbols, are rescued by using word lines WL in the memory part MEM2.

As a result of this, it is possible to shorten the time it takes for testing during test mode by testing multiple memory blocks BMLK in parallel, and to rescue defects by using bubble redundancy word lines BRWL during normal operation mode.

Figure 17:
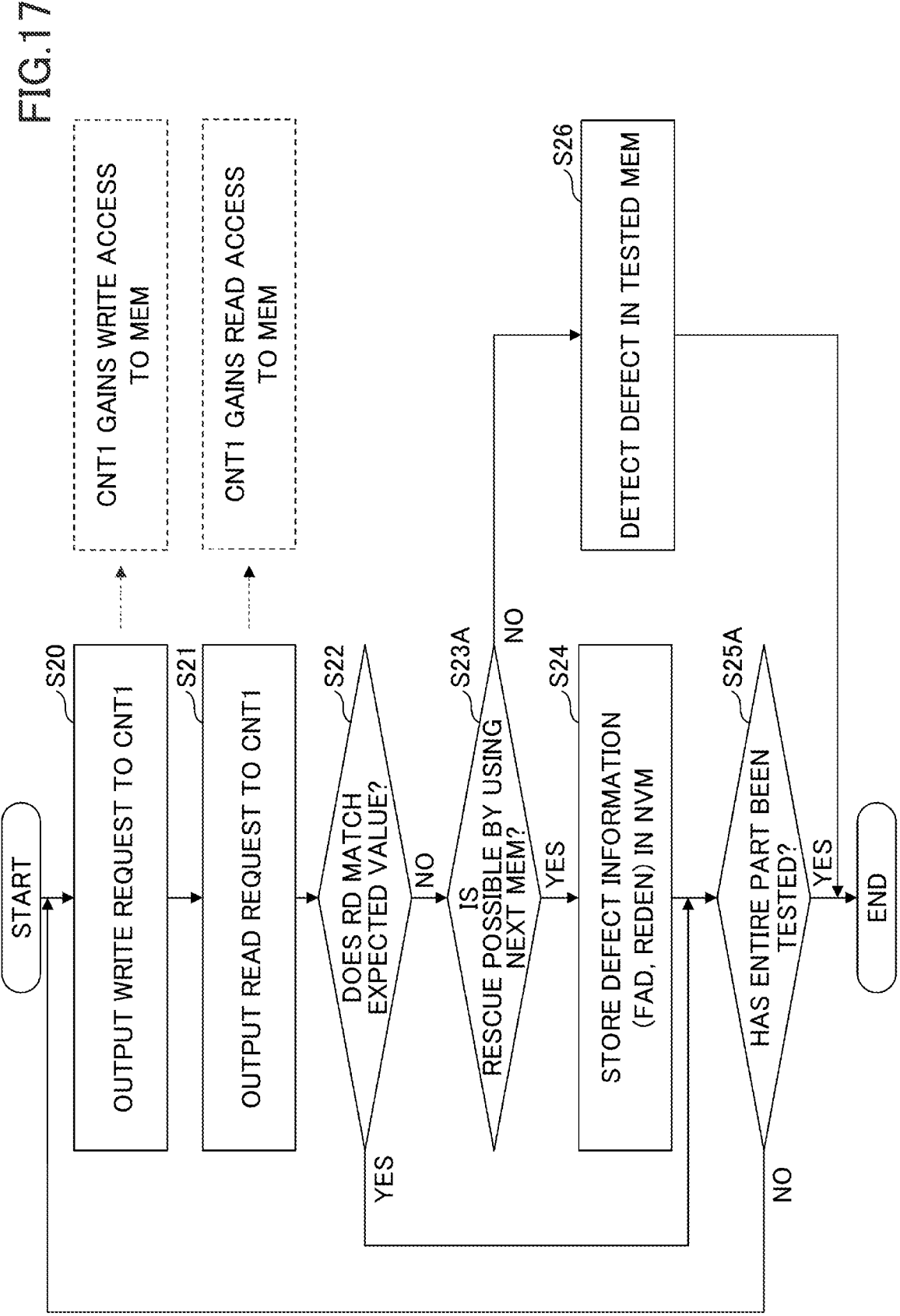
FIG. 17 is a flowchart that illustrates an example of a first test for detecting defects in each memory part, conducted by each test circuit of FIG. 15.

FIG. 17 illustrates an example of a first test, in which each test circuit BIST in FIG. 15 detects defects in corresponding memory parts MEM. Parts of the operation that are similar to or the same as those in FIG. 5 will be assigned the same step numbers, and their detailed description will be omitted. For example, the first test illustrated in FIG. 17 is conducted, in parallel, in one test circuit BIST in multiple groups GR. The test flow illustrated in FIG. 17 is the same as the test flow illustrated in FIG. 5, except that step S23A is performed instead of step S23 in FIG. 5, and S25A is performed instead of step S25.

In step S23A, each test circuit BIST determines whether a defect can be rescued by using a word line WL in the next memory part MEM. The test circuit BIST executes step S24 when the defect is rescuable, and executes step S26 when the defect is not rescuable. For example, an example in which a defect cannot be rescued is when a word line WL in the next memory part MEM that is specified by a fail address FAD cannot be accessed. Following step S24, in step S25A, when the test circuit BIST tests the entire part of the memory part MEM, the operation illustrated in FIG. 17 ends. If there is an untested part in the memory part MEM, the test circuit BIST returns to step S20.

Figure 18:
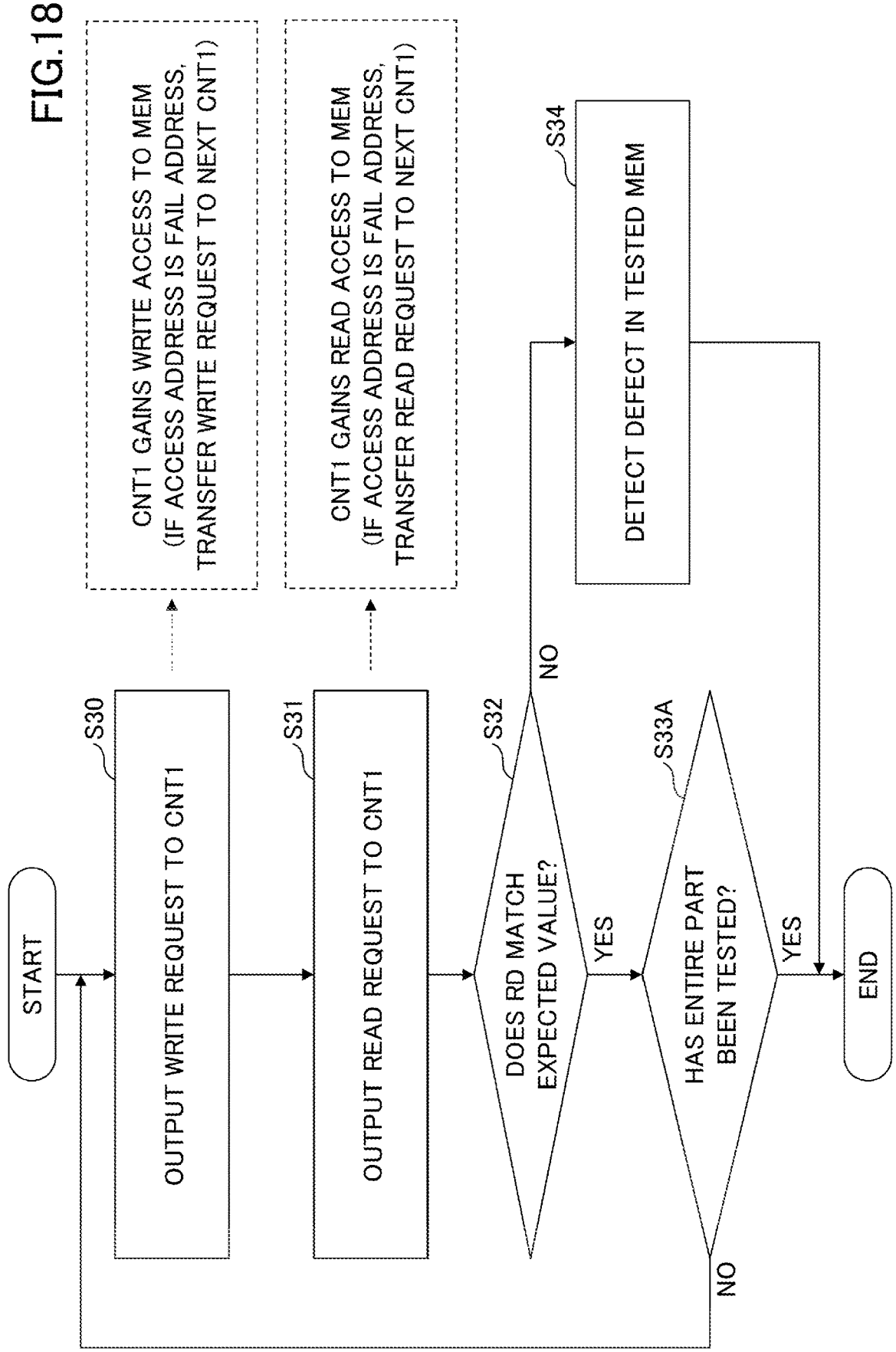
FIG. 18 is a flowchart that illustrates an example of a second test for checking the operation of each memory part, conducted by each test circuit of FIG. 15 after defect information is stored in a non-volatile memory.

FIG. 18 illustrates an example of a second test in which each test circuit BIST of FIG. 1 checks the operation of the corresponding memory part MEM after each test circuit BIST in FIG. 15 stores defect information in the non-volatile memory NVM. Parts of the operation that are similar to or the same as those in FIG. 6 will be assigned the same step numbers, and their detailed description will be omitted. For example, the second test illustrated in FIG. 18 is conducted, in parallel, in one test circuit BIST in multiple groups GR. The test flow illustrated in FIG. 18 is the same as the test flow illustrated in FIG. 5, except that step 33A is performed instead of step S33 of FIG. 6. Following step S32, in step S33A, when the test circuit BIST has tested the entire part of the memory part MEM, the operation illustrated in FIG. 18 ends. If there is an untested part in the memory part MEM, the test circuit BIST returns to step S30.

Note that, when the address included in a write request matches the fail address FAD stored in the non-volatile memory NVM, the memory control part CNT1 having received the write request from the test circuit BIST transfers the write request to the next memory control part CNT1. Also, if the access address included in the write request received from the test circuit BIST does not match the fail address FAD stored in the non-volatile memory NVM, the memory control part CNT1 gains write access to the memory part MEM by using the address included in the write request, and writes the test data (expected value) in the memory part MEM. The memory control part CNT1 having received the write request from the next memory control part CNT1 gains write access to the memory part MEM by using the address included in the write request, and writes the test data (expected value) in the memory part MEM.

If the address included in a read request received from the test circuit BIST matches the fail address FAD stored in the non-volatile memory NVM, the memory control part CNT1 transfers the read request to the next memory control part CNT1. Also, if the access address included in the read request received from the test circuit BIST does not match the fail address FAD stored in the non-volatile memory NVM, the memory control part CNT1 gains read access to the memory part MEM by using the address included in the read request. The memory control part CNT1 having received the read request from the next memory control part CNT1 gains read access to the memory part MEM by using the address included in the read request.

Thus, as described above, the sixth embodiment can provide the same advantages as those provided by the first embodiment. For example, during test mode, multiple memory parts MEM can be accessed and tested in parallel, and, during normal operation mode, multiple memory parts MEM can be accessed as one memory. As a result of this, it is possible to provide a memory circuit 105 that can operate as multiple small-capacity memories and as a large-capacity memory by switching its operation mode. Also, during test mode, multiple memory parts MEM can be accessed and tested in parallel, so that testing can be conducted more efficiently, in a shorter period of time. As a result of this, an increase in the manufacturing cost of the memory circuit 105 can be substantially prevented.

Furthermore, according to the sixth embodiment, during test mode, in each group GR, a defect in one memory part MEM is rescued by using a word line WL in the other memory part MEM. As a result of this, the first and second tests can be conducted without assigning a bubble redundancy word line BRWL to each memory part MEM as illustrated in FIG. 1, so that it is possible to test the entire part of each memory part MEM.

Figure 19:
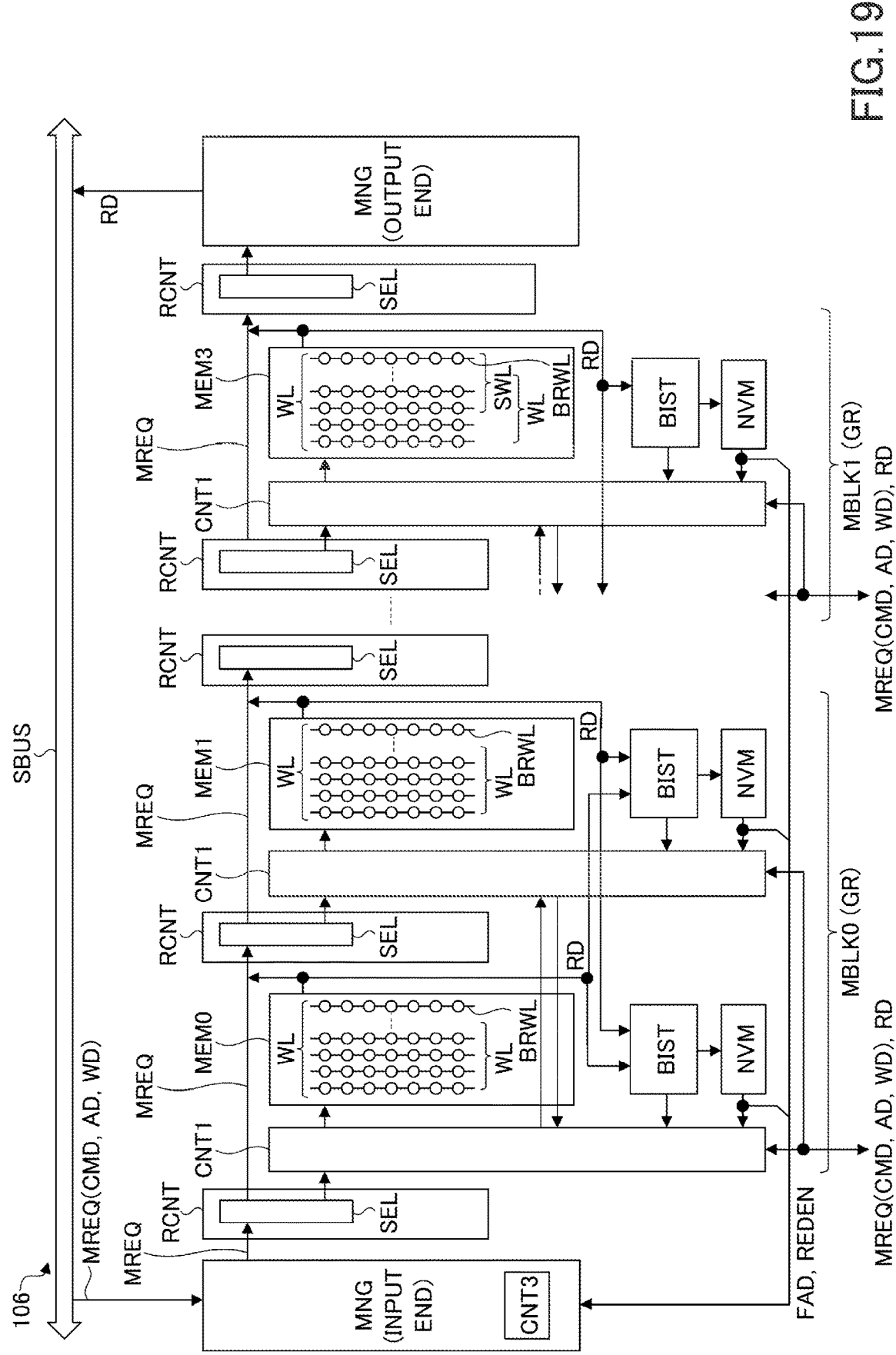
FIG. 19 is a block diagram that illustrates an overview of a memory circuit according to a seventh embodiment.

FIG. 19 illustrates an overview of a memory circuit according to a seventh embodiment. Below, elements that are similar to or the same as those in FIG. 15 will be assigned the same reference numerals, and their detailed description will be omitted. As in FIG. 9, the memory circuit 106 illustrated in FIG. 19 can read and write data to and from multiple memory parts MEM, in parallel, from outside the memory circuit 106 during normal operation modes.

In this embodiment, as in FIG. 9, the normal operation modes include a first normal operation mode, in which multiple memory parts MEM can be accessed in parallel as small-capacity memories, and a second normal operation mode, in which multiple memory parts MEM can be accessed in parallel as one large-capacity memory. In the first normal operation mode, an access request MREQ is delivered to each memory control part CNT1. In the second normal operation mode, an access request MREQ is delivered to the memory management part MNG of the input end. Note that the testing of the memory blocks MBLK in test mode is the same as the testing of memory blocks MBLK illustrated in FIG. 17 and FIG. 18.

According to this embodiment, in the first normal operation mode, each memory block BLK uses one of a pair of memory parts MEM in its group GR as a main memory space, and uses the other one of the pair of memory parts MEM as a redundancy memory space for rescuing defects. That is, the method of rescuing defects in the first normal operation mode is the same as the rescue method in the test mode illustrated in FIG. 16. Furthermore, the method of rescuing defects in the second normal operation mode is the same as the rescue method in the normal operation mode illustrated in FIG. 16.

Note that, in the first normal operation mode, it is also possible to rescue defects per memory part MEM, independently, as in the second embodiment (FIG. 9, FIG. 10, and FIG. 11). In that case, although not illustrated in FIG. 19, the pair of memory control parts CNT1 in each memory block MBLK (that is, each group GR) both have a function to receive an access request MREQ (CMD, AD, and WD) from outside the memory circuit 106, and a function to output read data RD to the outside of the memory circuit 106. Note that each memory control part CNT1 may receive an access request MREQ via the system bus SBUS and output read data RD to the system bus SBUS.

Thus, as described above, the seventh embodiment can provide the same advantages as those of the first to sixth embodiments.

Figure 20:
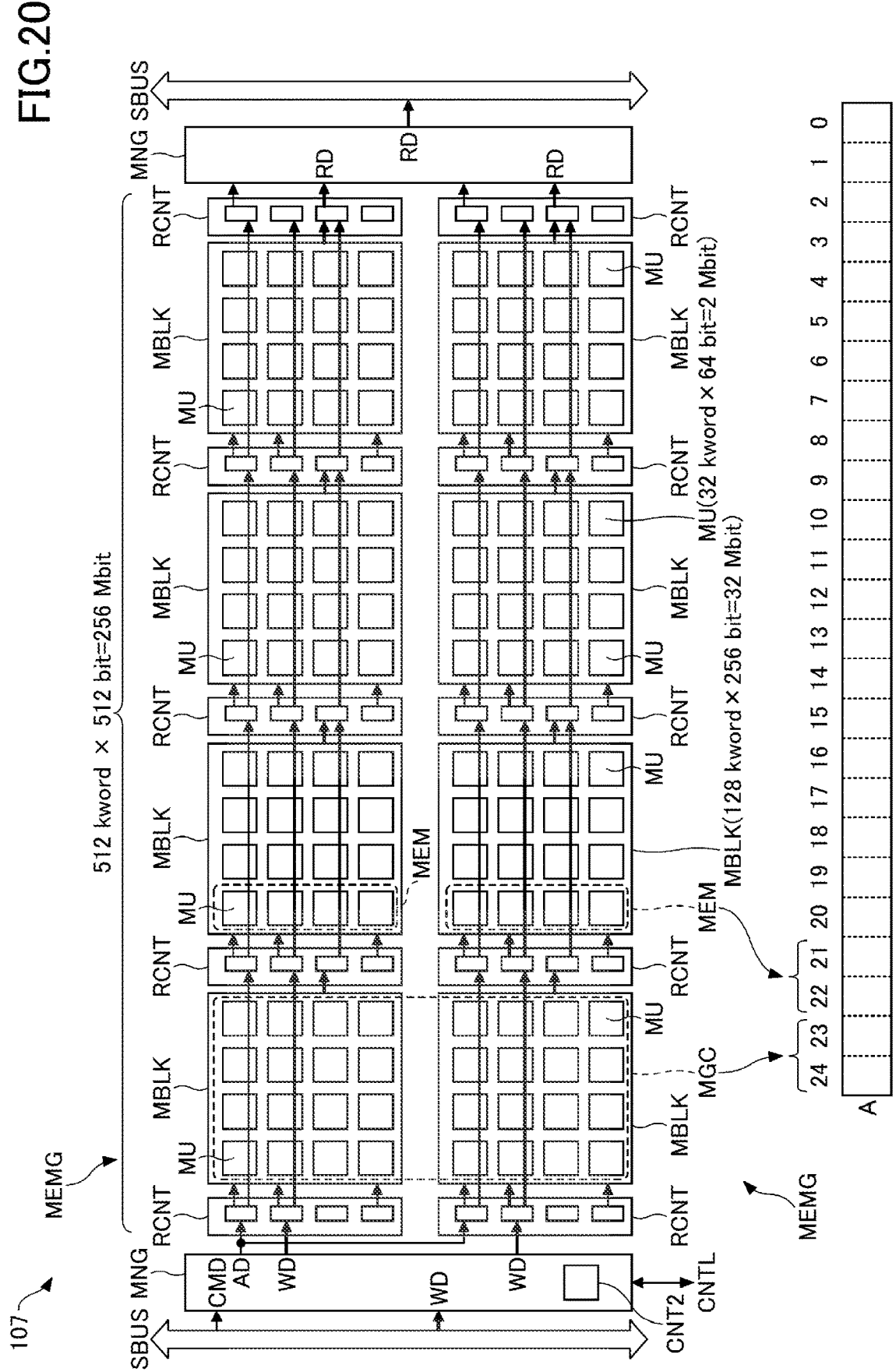
FIG. 20 is a block diagram that illustrates an overview of a memory circuit according to an eight embodiment.

FIG. 20 illustrates an overview of a memory circuit according to an eight embodiment. Below, elements that are similar to or the same as the embodiments described above will be assigned the same reference numerals, and their detailed description will be omitted. The memory circuit 107 illustrated in FIG. 20 includes: 5 repeater control parts RCNT, placed between the memory management part MNG of the input end and the memory management part MNG of the output end, and memory blocks MBLK, each placed between two neighboring repeater control parts RCNT.

The memory circuit 107 includes two memory groups MEMG, each MEMG being formed with 5 repeater control parts RCNT, and 4 memory blocks MBLK that are all placed between neighboring repeater control parts RCNT. In each memory group MEMG, the first repeater control part RCNT is connected to the memory management part MNG of the input end, and the last repeater control part RCNT is connected to the memory management part MNG of the output end. Note that the number and arrangement of memory blocks MBLKs installed in the memory circuit 107 are not limited to the example illustrated in FIG. 20.

Each memory block MBLK has 16 memory units MU, four in the vertical direction and four in the horizontal direction. Note that the number and arrangement of memory units MU mounted in each memory block MBLK are not limited to the example illustrated in FIG. 20.

Although not particularly limited, the size of each memory unit MU is 32 k words×64 bits (=2 M bits), and the four memory units MU arranged in the vertical direction input and output 256 bits of data. The size of a memory block MBLK including 16 memory units MU is 128 k words×256 bits (=32 M bits). The size of the memory circuit 107 including eight memory blocks MBLK is 512 k words× 512 bits (=256 M bits).

Two memory blocks MBLK arranged in the vertical direction constitute a memory group column MGC. According to this embodiment, each memory part MEM is formed with four memory units MU arranged in the vertical direction. For example, each memory group column MGC is identified by the bits [24:23] in an address AD of 25 bits. Likewise, each memory part MEM is identified by the bits [22:21] in an address AD of 25 bits.

The memory circuit 107 operates upon receiving an access request MREQ from the system bus SBUS during the second normal operation mode, in which all memory parts MEM can be accessed as one large-capacity memory. During the second normal operation mode, the repeater control part RCNT on the input side of each memory block MBLK outputs an access request MREQ (command CMD, address AD, and write data WD) to the memory block MBLK or to the repeater control part RCNT on the output side of the memory block MBLK. Each memory block MBLK outputs read data RD to the repeater control part RCNT on the output side.

As illustrated in FIG. 20, the command line CMD and address line AD are not wired through multiple memory blocks MBLK. As a result of this, it is possible to substantially prevent an increase in the burden of wiring, an increase in the time it takes to access the memory circuit 107, and an increase in power consumption.

On the other hand, the memory circuit 107 can read and write data per memory part MEM, or per two memory parts MEM, from outside the memory circuit 107.

Figure 21:
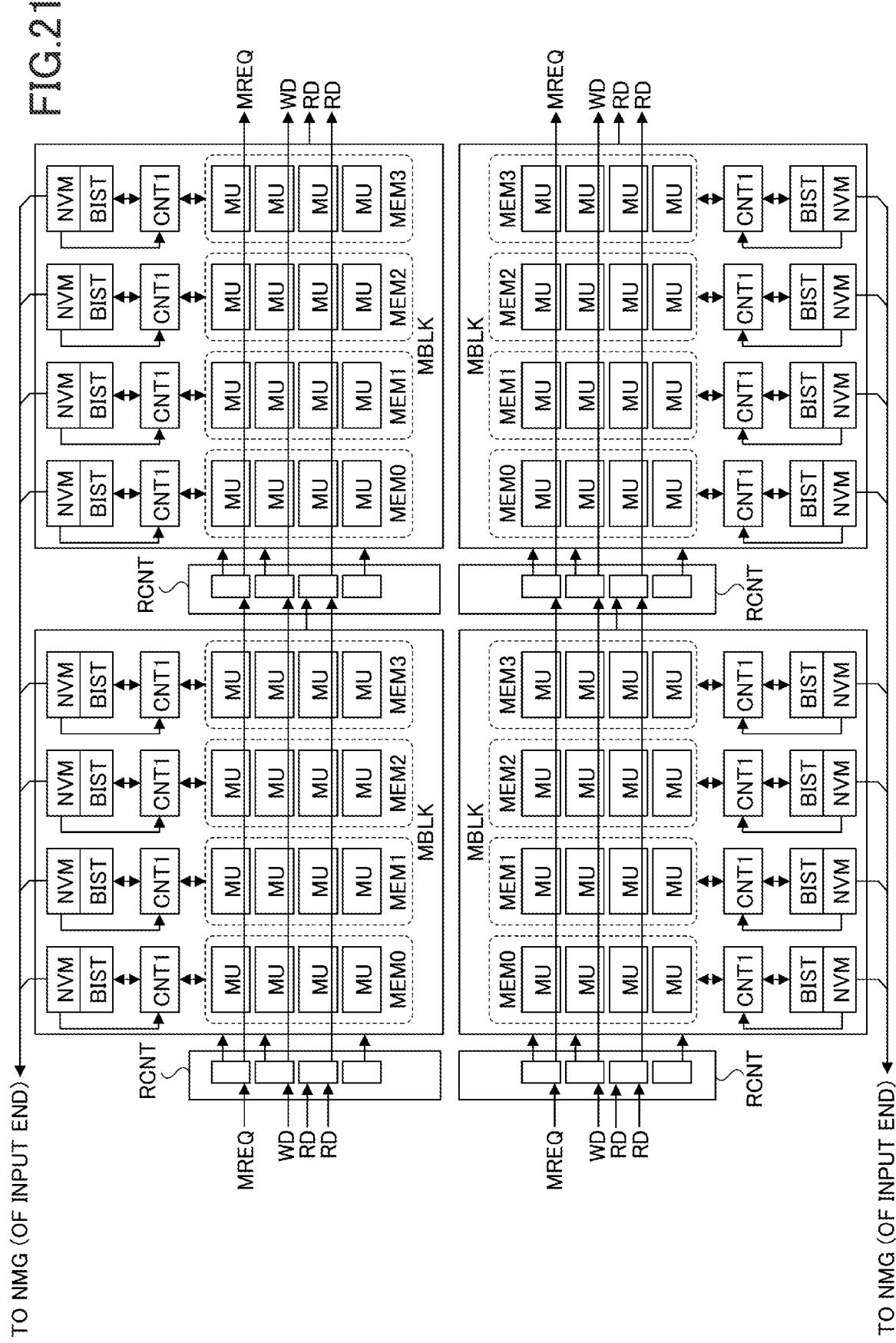
FIG. 21 is a block diagram that illustrates an example in which the memory groups of FIG. 20 are structured.

FIG. 21 illustrates an example of the memory block MBLK in FIG. 20. For example, FIG. 21 illustrates four memory blocks MBLK in the center part, which are away from the memory management parts MNG of the input end and the output end in FIG. 20.

Each memory block MBLK has the same or similar structure as the memory blocks MBLK of FIG. 12. That is, each memory block MBLK includes 4 memory parts MEM, 4 memory control parts CNT1, 4 test circuits BIST, and 4 non-volatile memories NVM. Note that, as illustrated in FIG. 15 or FIG. 19, each memory block MBLK may be formed with two groups GR, and, during test mode, in each group GR, defects in one memory part MEM may be rescued by using word lines WL in the other memory part MEM.

FIG. 22 illustrates another example of the memory blocks MBLK of FIG. 20. FIG. 22 shows four memory blocks MBLK in the center part, away from the memory management parts MNG of the input end and the output end in FIG. 20.

Each memory block MBLK has the same structure as that of the memory blocks MBLK in FIG. 21, except that the memory control part CNT1, test circuit BIST, and non-volatile memory NVM are provided so as to be shared by two memory parts MEM. Note that, in each memory block MBLK, the memory control part CNT1, test circuit BIST, and non-volatile memory NVM may be shared by four memory parts MEM. That is, the way the memory control part CNT1, test circuit BIST, and non-volatile memory NVM are provided may vary per memory block MBLK. Also, as illustrated in FIG. 15 or FIG. 19, each memory block MBLK may be formed with two groups GR, and, during test mode, in each group GR, defects in one memory part MEM may be rescued by using word lines WL in the other memory part MEM.

Thus, as described above, the eighth embodiment can provide the same advantages as those provided by the first to seventh embodiments.

FIG. 23 illustrates an example of a system in which the memory circuit 100 of FIG. 1 is installed. For example, the system 200 illustrated in FIG. 23 is a head-mounted device such as an AR/VR glass, a digital camera, a game console, and so forth that can process movies/images. Note that the system 200 may be an image processing system mounted to be in a vehicle. Also, the system in which the memory circuit 100 is mounted is by no means limited to the structure illustrated in FIG. 23.

The system 200 includes a controller 210, an image-capturing device 220, a display device 230, and an external memory 240. The controller 210 includes a CPU 211, an image processing part 212, a display processing part 213, an encoder/decoder 214, an external memory control part 215, and the memory circuit 100 illustrated in FIG. 1, which are interconnected via a system bus SBUS. For example, the controller 210 may be designed as an LSI system.

Note that the controller 210 may include the memory circuit 101 of FIG. 9, the memory circuit 102 of FIG. 12, the memory circuit 103 of FIG. 13, the memory circuit 104 of FIG. 14, the memory circuit 105 of FIG. 15, the memory circuit 106 of FIG. 19, or the memory circuit 107 of FIG. 20. Note that, for example, although the memory circuits 100, 101, 102, 103, 104, 105, 106, and 107 are SRAMs, these memory circuits may be other memory circuits that allow random access, such as MRAMs or resistive random access memories.

The CPU 211 controls the entire system 200. The image processing part 212 processes image data that is acquired by the image-capturing device 220, converts the processed image data to frame image data that can be displayed on the display device 230, and stores the frame image data in the memory circuit 100. The display processing part 213 reads the frame image data from the memory circuit 100 and displays images on the display device 230. The encoder/decoder 214 encodes the image data before it is stored in the memory circuit 100, and decodes the compressed image data read from the memory circuit 100. The external memory control part 215 controls access to the external memory 240, which is a dynamic random access memory (DRAM) or the like.

Although embodiments of the present invention have been described above, the present invention is by no means limited to the specifications of the above embodiments. That is, various changes can be made within the scope of the present invention, with appropriate arrangements/adjustments, depending on the mode of implementation.

What is claimed is:

1. A memory circuit comprising:
   a plurality of memory parts, each of which includes a plurality of first memory cells and a second memory cell that is accessed when one of the first memory cells is defective;
   a plurality of first memory control parts, each of which is configured to control access to a corresponding one of the plurality of memory parts based on a first access request addressing the corresponding memory part, during a first mode; and
   a second memory control part shared by the plurality of memory parts, and configured to control access to the plurality of memory parts based on a second access request during a second mode,
   wherein a predetermined one of the plurality of memory parts includes a plurality of third memory cells that correspond, respectively, to a plurality of second memory cells in the plurality of memory parts,
   wherein, when a first address that specifies an inaccessible one of the first memory cells is included in the first access request during the first mode, a corresponding one of the first memory control parts converts the first address to a second address that specifies the second memory cell, and outputs the second address to the corresponding one of the plurality of memory parts, and
   wherein, when a second address that specifies one of the plurality of second memory cells in the plurality of memory parts is included in the second access request, the second memory control part converts the second address to a third address that specifies one of the plurality of third memory cells, and outputs the third address to the predetermined one of the plurality of memory parts including the plurality of third memory cells.

2. The memory circuit according to claim 1, wherein the plurality of first memory control parts operate in parallel during the first mode, so that the memory parts corresponding, respectively, to the first memory control parts can be accessed in parallel.

3. The memory circuit according to claim 1, further comprising a plurality of repeater control parts, each of which is placed between the second memory control part and one or more of the plurality of memory parts that are connected in series, and configured to transfer, one after another, second access requests that arrive from the second memory control part during the second mode,
   wherein a memory block including one or more of the plurality of memory parts is placed between a pair of neighboring repeater control parts, and
   wherein each one of the plurality of repeater control parts:
      when the second access request requests access to a subsequent memory block that is located immediately after the repeater control part, outputs the second access request to the subsequent memory block; and when the second access request requests access to a memory block that is located after the subsequent memory block, outputs the second access request to a next repeater control part.

4. The memory circuit according to claim 1, further comprising:
a non-volatile memory configured to store defect information about the plurality of memory parts; and
a plurality of test circuits that correspond, respectively, to the plurality of memory parts, and that are configured to operate in parallel during the first mode and test the plurality of memory parts,
wherein every test circuit outputs a write request and a read request, each request being the first access request, to the corresponding first memory control part, and, when the inaccessible first memory cell is detected, stores a fail address that specifies the inaccessible first memory cell in the non-volatile memory, and
wherein, after the plurality of test circuits test the memory parts, in response to an address included in the first access request matching the fail address stored in the non-volatile memory, the corresponding first memory control part converts the address included in the first access request to the second address, and outputs the second address to the corresponding memory part.

5. The memory circuit according to claim 4, wherein, after the fail address is stored in the non-volatile memory, every test circuit outputs the write request and the read request stored in the non-volatile memory, including the fail address, to the corresponding first memory control part, as the first access request, and determines whether read data output from the corresponding memory part in response to the read request matches an expected value.

6. A memory circuit comprising:
a plurality of memory parts, each of which includes a plurality of first memory cells;
a plurality of first memory control parts, each of which is configured to control access to a corresponding one of the plurality of memory parts based on a first access request addressing a corresponding memory part, during a first mode; and
a second memory control part shared by the plurality of memory parts, and configured to control access to the plurality of memory parts based on a second access request during a second mode,
wherein a predetermined one of the plurality of memory parts includes a plurality of second memory cells that are accessed instead of inaccessible first memory cells in each of the plurality of memory parts during the second mode,
wherein the plurality of memory parts are divided into groups per pair of memory parts,
wherein one of a pair of first memory control parts corresponding to a pair of memory parts:
when an address that specifies the inaccessible first memory cell is included in a first access request during the first mode, outputs the address to the other one of the pair of first memory control parts;
when an address arrives from the other one of the first memory control parts, outputs the received address to the corresponding memory part; and
when an address that specifies a normal first memory cell is included in the first access request, outputs the address to the corresponding memory part, and
wherein, when the address that specifies the inaccessible first memory cell is included in the second access request, the second memory control part converts the address to an address that specifies one of the plurality of second memory cells, and outputs the converted address to the predetermined one of the plurality of memory parts.

7. The memory circuit according to claim 6,
wherein each of the plurality of memory parts is included in a corresponding one of the plurality of groups, and
wherein the first memory control parts in the plurality of groups, each first memory control part corresponding to one of the pair of memory parts in each group, operate during the first mode, so that one of the memory parts in each group can be accessed in parallel.

8. The memory circuit according to claim 6, further comprising a plurality of repeater control parts, each of which is placed between the second memory control part and one or more of the plurality of memory parts that are connected in series, and configured to transfer, one after another, second access requests that arrive from the second memory control part during the second mode,
wherein a memory block including one or more of the plurality of memory parts is placed between a pair of neighboring repeater control parts, and
wherein each one of the plurality of repeater control parts:
when the second access request requests access to a subsequent memory block that is located immediately after the repeater control part, outputs the second access request to the subsequent memory block; and
when the second access request requests access to a memory block that is located after the subsequent memory block, outputs the second access request to a next repeater control part.

9. The memory circuit according to claim 6, further comprising:
a non-volatile memory configured to store defect information about the plurality of memory parts; and
a plurality of test circuits that correspond, respectively, to the plurality of memory parts, and that are configured to operate in parallel during the first mode and test respective corresponding memory parts,
wherein, in the plurality of test circuits, a test circuit that corresponds to the one first memory control part and a test circuit that corresponds to the other first memory control part operate alternately,
wherein one of the test circuits that is in operation outputs a write request and a read request, each request being the first access request, to a corresponding first memory control part, and, when an inaccessible first memory cell is detected, stores a fail address that specifies the inaccessible first memory cell, in the non-volatile memory, and
wherein, after the fail address is stored in the non-volatile memory, in response to an address included in the read request matching the fail address stored in the non-volatile memory, the one first memory control part outputs the address included in the read request to the other first memory control part.

10. The memory circuit according to claim 9, wherein, after the fail address is stored in the non-volatile memory, the test circuit that is in operation outputs the write request and the read request to the, including the fail address stored in the non-volatile memory, each request being the first access request, and determines whether the read data output from a memory part that does not correspond to the operating test circuit matches an expected value.

* * * * *